United States Patent
Rao et al.

(10) Patent No.: US 11,275,948 B2
(45) Date of Patent: Mar. 15, 2022

(54) UTILIZING MACHINE LEARNING MODELS TO IDENTIFY CONTEXT OF CONTENT FOR POLICY COMPLIANCE DETERMINATION

(71) Applicant: Accenture Global Solutions Limited, Dublin (IE)

(72) Inventors: Srikanth G. Rao, Bangalore (IN); Tarun Singhal, Bangalore (IN); Mathangi Sandilya, Bangalore (IN); Vipin Anilkumar Bhasin, Pune (IN); Bolaka Mukherjee, Howrah (IN); J. Nooji Shekar, Bengaluru (IN); Manish Phukan, Assam (IN); Swati Dubey, Bangalore (IN); Mamta Kanad Bhagwat, Mumbai (IN); T Siva Rama Sarma, Secunderabad (IN)

(73) Assignee: Accenture Global Solutions Limited, Dublin (IE)

( * ) Notice: Subject to any disclaimer, the term of this patent is extended or adjusted under 35 U.S.C. 154(b) by 266 days.

(21) Appl. No.: 16/709,580

(22) Filed: Dec. 10, 2019

(65) Prior Publication Data

US 2021/0174089 A1     Jun. 10, 2021

(51) Int. Cl.
*G06K 9/00* (2006.01)
*G06N 20/00* (2019.01)
(Continued)

(52) U.S. Cl.
CPC ....... *G06K 9/00718* (2013.01); *G06K 9/6267* (2013.01); *G06K 9/726* (2013.01); *G06N 20/00* (2019.01)

(58) Field of Classification Search
None
See application file for complete search history.

(56) References Cited

U.S. PATENT DOCUMENTS

| 2014/0023348 A1* | 1/2014 | O'Kelly | G11B 27/031 386/278 |
| 2021/0027065 A1* | 1/2021 | Chung | G06N 20/00 |
| 2021/0136459 A1* | 5/2021 | Mathur | G10L 15/26 |

FOREIGN PATENT DOCUMENTS

EP     3401805 A1    11/2018

OTHER PUBLICATIONS

Utopia Analytics, "Your rules, our tools. Automation with Utopia AI Moderator increases quality, improves publishing speed and reduces costs.", https://utopiaanalytics.com/utopia-ai-moderator/, Apr. 27, 2018, 13 pages.

(Continued)

*Primary Examiner* — Leon Viet Q Nguyen
(74) *Attorney, Agent, or Firm* — Harrity & Harrity, LLP

(57) ABSTRACT

A device may receive video data associated with a video, and may identify image data associated with the video data and that corresponds to a frame of the video. The device may process the image data, with an image analysis model, to determine an image compliance score associated with a policy and with context of the image data, and may identify text data associated with the video data. The device may process the text data, with a text analysis model, to determine a text compliance score associated with the policy and with context of the text data, and may determine, based on the image compliance score and the text compliance score, an aggregate compliance score associated with the frame. The device may determine whether the aggregate compliance score satisfies a threshold associated with the policy, and may perform actions based on whether the aggregate compliance score satisfies the threshold.

20 Claims, 20 Drawing Sheets

(51) Int. Cl.
*G06K 9/62* (2022.01)
*G06K 9/72* (2006.01)

(56) References Cited

OTHER PUBLICATIONS

Wikipedia, "Moderation system", https://en.wikipedia.org/wiki/Moderation_system, Sep. 22, 2019, 4 pages.
Eloi Brassard-Gourdeau et al., "Impact of Sentiment Detection to Recognize Toxic and Subversive Online Comments", Dec. 4, 2018, 9 pages.
Two Hat Security, "New Research Suggests Sentiment Analysis is Critical in Content Moderation", https://www.twohat.com/new-research-suggests-sentiment-analysis-is-crtical-in-content-moderation/#, Jan. 15, 2019, 6 pages.

\* cited by examiner

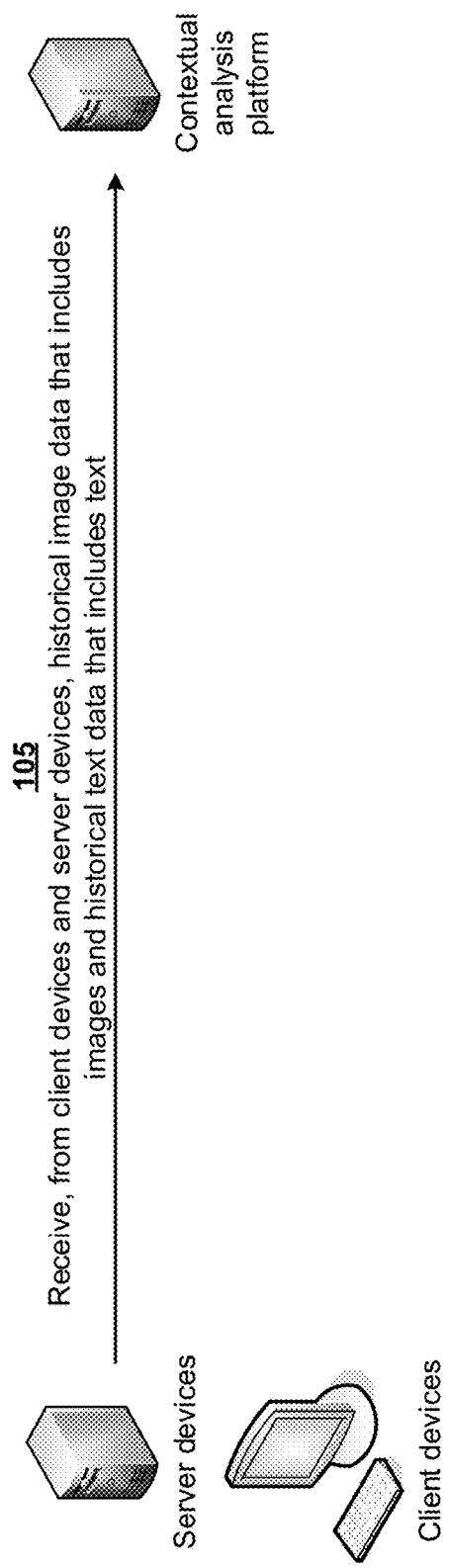

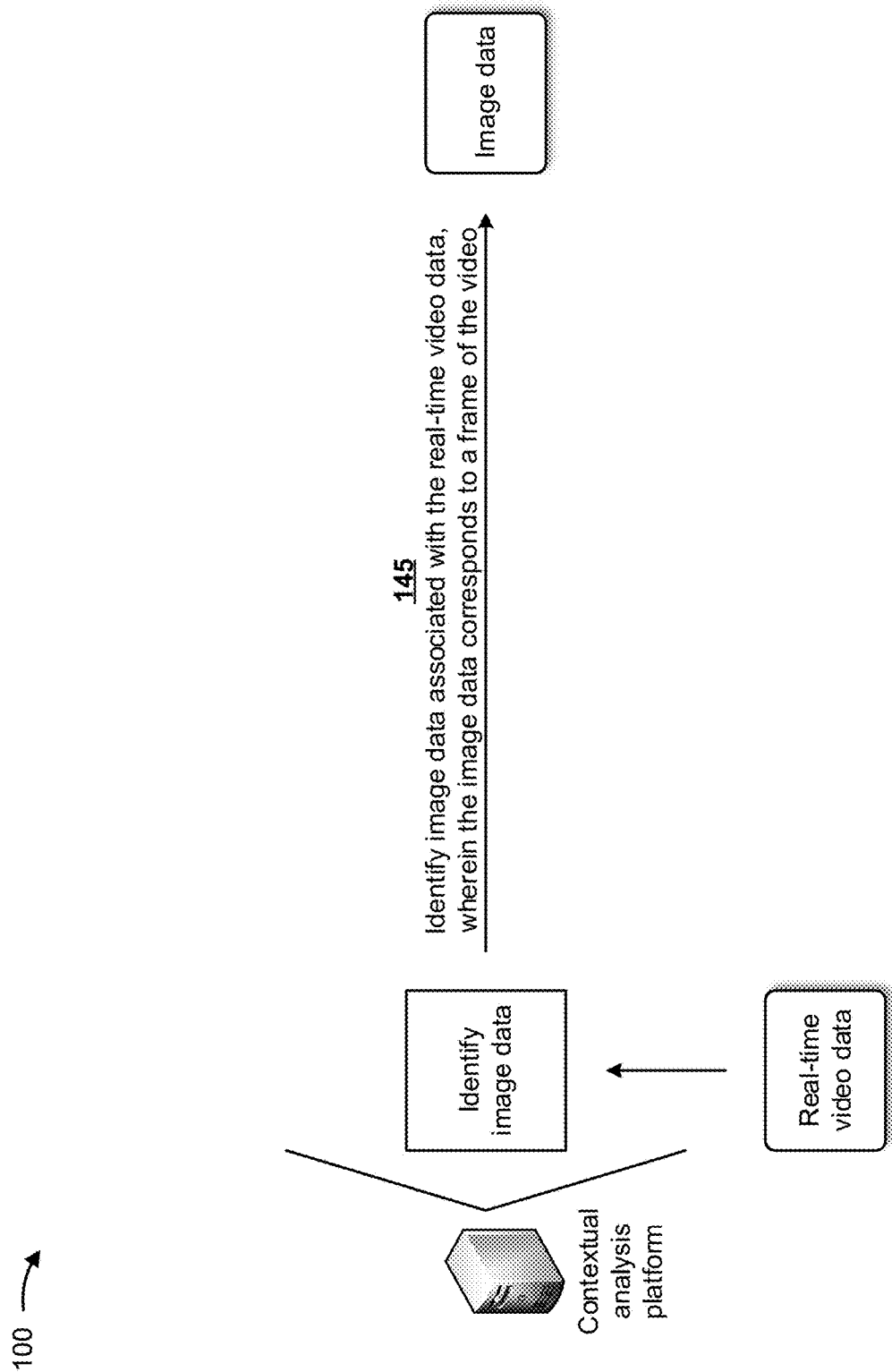

US 11,275,948 B2

UTILIZING MACHINE LEARNING MODELS TO IDENTIFY CONTEXT OF CONTENT FOR POLICY COMPLIANCE DETERMINATION

BACKGROUND

Content moderation is the practice of monitoring and applying a policy, a set of rules, and/or guidelines to user-generated submissions of content (e.g., images, videos, text, audio, and/or the like) to determine whether the content is compliant (e.g., complies with the policy, the set of rules, and/or the guidelines). For example, a content moderation system may determine content that is obscene, illegal, insulting, racist, and/or the like as inappropriate (e.g., non-compliant) and may prevent the content from being posted online. Moderating inappropriate content online is important to protect innocent online users from being exposed to such inappropriate content.

SUMMARY

According to some implementations, a method may include receiving video data associated with a video, and identifying image data associated with the video data, wherein the image data may correspond to a frame of the video. The method may include processing the image data, with an image analysis model, to determine an image compliance score associated with the image data, wherein the image compliance score may be associated with a policy and with context of the image data. The method may include identifying text data associated with the video data, and processing the text data, with a text analysis model, to determine a text compliance score associated with the text data, wherein the text compliance score may be associated with the policy and with context of the text data. The method may include determining, based on the image compliance score and the text compliance score, an aggregate compliance score associated with the frame of the video, and determining whether the aggregate compliance score satisfies a threshold score associated with the policy. The method may include performing one or more actions associated with the video based on whether the aggregate compliance score satisfies the threshold score.

According to some implementations, a device may include one or more memories, and one or more processors, communicatively coupled to the one or more memories, to receive video data associated with a video, and identify image data associated with the video data, wherein the image data may correspond to one or more frames of the video. The one or more processors may process the image data, with an image analysis model, to determine an image compliance score associated with the image data, wherein the image analysis model may be trained based on associations between a plurality of objects included in historical image data, and wherein the image compliance score may be associated with a policy and with context of the image data. The one or more processors may identify text data associated with the video data, and may process the text data, with a text analysis model, to determine a text compliance score associated with the text data, wherein the text analysis model may be trained based on associations between a plurality of words included in historical text data, and wherein the text compliance score may be associated with the policy and with context of the text data. The one or more processors may determine, based on the image compliance score and the text compliance score, an aggregate compliance score associated with the one or more frames of the video, and may determine whether the aggregate compliance score satisfies a threshold score associated with the policy. The one or more processors may perform one or more actions associated with the video based on whether the aggregate compliance score satisfies the threshold score.

According to some implementations, a non-transitory computer-readable medium may store one or more instructions that, when executed by one or more processors of a device, may cause the one or more processors to train an image analysis model based on associations between a plurality of objects included in historical image data, and train a text analysis model based on associations between a plurality of words included in historical text data. The one or more instructions may cause the one or more processors to receive video data associated with a video, and identify image data associated with the video data, wherein the image data may correspond to a frame of the video. The one or more instructions may cause the one or more processors to process the image data, with the image analysis model, to determine an image compliance score associated with the image data, wherein the image compliance score may be associated with context of the image data and with a policy that dictates conditions for finding video compliant or non-compliant. The one or more instructions may cause the one or more processors to identify text data associated with the video data, and process the text data, with the text analysis model, to determine a text compliance score associated with the text data, wherein the text compliance score may be associated with the policy and with context of the text data. The one or more instructions may cause the one or more processors to determine, based on the image compliance score and the text compliance score, an aggregate compliance score associated with the frame of the video, and determine whether the aggregate compliance score satisfies a threshold score associated with the policy. The one or more instructions may cause the one or more processors to perform one or more actions associated with the video based on whether the aggregate compliance score satisfies the threshold score.

DETAILED DESCRIPTION

Figure 1B:
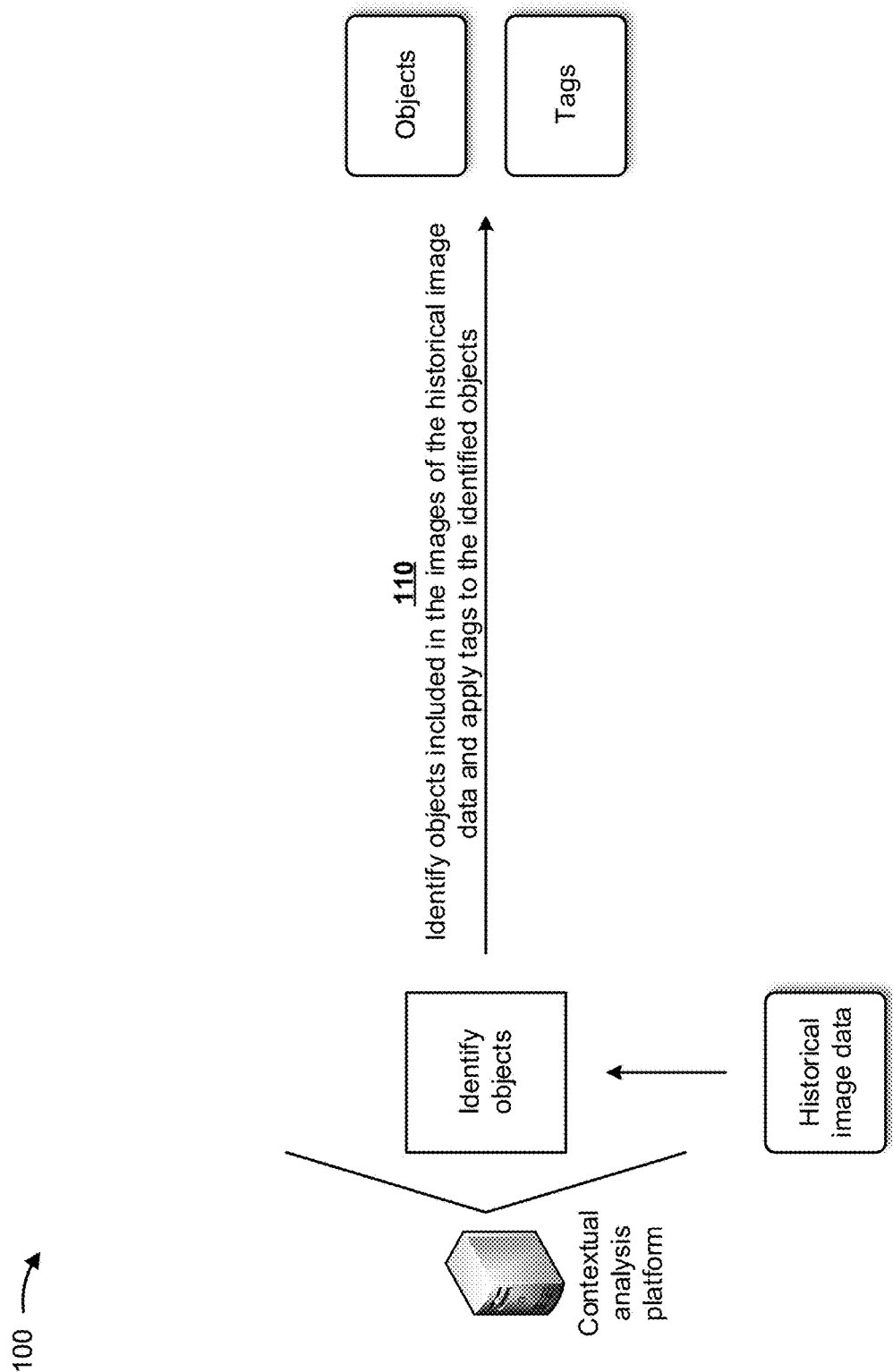
FIGS. 1A-1O are diagrams of one or more example implementations described herein.

The following detailed description of example implementations refers to the accompanying drawings. The same reference numbers in different drawings may identify the same or similar elements.

Current content moderation systems may identify inappropriate information (e.g., profanity, nudity, and/or the like) in content but fail to identify context of the content, which may make the content appropriate. For example, current content moderation systems may identify alcohol and a child, in an image of the child sitting with an adult that is drinking wine. In such an example, current content moderation systems may incorrectly determine that the image is inappropriate since the systems fail to identify the context of the image (e.g., the child is not drinking wine). In another example, current content moderation systems may identify alcohol and a vehicle, in a video of a vehicle driver that is holding a beer. In such an example, current content moderation systems may incorrectly determine that the video is appropriate since the systems fail to identify the context of the video (e.g., drinking and driving). Thus, current content moderation systems may waste computing resources (e.g., processing resources, memory resources, communication resources, and/or the like), networking resources, and/or the like associated with incorrectly determining compliance of content, handling legal actions associated with posting non-compliant content, removing the non-compliant content, and/or like.

Some implementations described herein provide a contextual analysis platform that utilizes machine learning models to identify context of content for policy compliance determination. For example, the contextual analysis platform may receive video data associated with a video, and may identify image data associated with the video data, wherein the image data may correspond to a frame of the video. The contextual analysis platform may process the image data, with an image analysis model, to determine an image compliance score associated with the image data, wherein the image compliance score may be associated with a policy and with context of the image data. The contextual analysis platform may identify text data associated with the video data, and may process the text data, with a text analysis model, to determine a text compliance score associated with the text data, wherein the text compliance score may be associated with the policy and with context of the text data. The contextual analysis platform may determine, based on the image compliance score and the text compliance score, an aggregate compliance score associated with the frame of the video, and may determine whether the aggregate compliance score satisfies a threshold score associated with the policy. The contextual analysis platform may perform one or more actions associated with the video based on whether the aggregate compliance score satisfies the threshold score.

In this way, the contextual analysis platform automatically identifies context of content for policy compliance determination based on machine learning models. The contextual analysis platform may moderate content based on identifying circumstances, factors, conditions, and/or the like associated with the content rather than just based on predefined policies. The contextual analysis platform may identify inappropriate content based on context of the content in order to determine whether the content is compliant or non-compliant. This, in turn, conserves computing resources, networking resources, and/or the like that would otherwise be wasted in incorrectly determining compliance of content, handling legal actions associated with posting non-compliant content, removing the non-compliant content, and/or like.

FIGS. 1A-1O are diagrams of one or more example implementations 100 described herein. As shown in FIG. 1A, one or more client devices may be associated with one or more server devices and a contextual analysis platform. The client devices may include mobile devices, computers, and/or the like associated with users wishing to post content online with content platforms. The server devices may include one or more devices associated with content platforms that host content (e.g., audio, images, video, social media posts, blogs, and/or the like) provided by the client devices. The contextual analysis platform may include a platform that utilizes machine learning models to identify context of content for policy compliance determination, as described herein.

As further shown in FIG. 1A, and by reference number 105, the contextual analysis platform may receive, from the client devices and/or the server devices, historical image data that includes images, and historical text data that includes text. In some implementations, the historical image data may include images associated with compliant content in accordance with one or more content policies, images associated with non-compliant content in accordance with the one or more content policies, text metadata associated with the images, and/or the like. Each of the one or more content policies may include a set of rules identifying content that is compliant content, non-compliant content, and/or the like. In some implementations, the historical text data may include words (e.g., that form sentences, clauses, phrases, and/or the like) associated with compliant content in accordance with the one or more content policies, words associated with non-compliant content in accordance with the one or more content policies, and/or the like.

In some implementations, for each type of category violation (e.g., as defined by the one or more content policies), the contextual analysis platform may annotate the historical image data and/or the historical text data as compliant or non-compliant. In some implementations, for every image of the historical image data, the contextual analysis platform may retrieve tags that describe objects, scenes, context, and/or the like in the image based on computer vision techniques (e.g., an object detection technique, a scene recognition technique, and/or the like). In addition to the historical image data and the historical text data, the contextual analysis platform may receive profile data identifying profiles of users of the client device, data identifying demographics of the users, data identifying networks utilized by the users, and/or the like.

In some implementations, the contextual analysis platform may continuously receive the historical image data and/or the historical text data, may periodically receive the historical image data and/or the historical text data (e.g., in minutes, hours, days, months, and/or the like), may receive the historical image data and/or the historical text data based on requests for the historical image data and/or the historical text data, and/or the like. The contextual analysis platform may store the historical image data and/or the historical text data in a data structure (e.g., a database, a table, a list, and/or the like) associated with the contextual analysis platform.

In some implementations, the contextual analysis platform may utilize one or more text processing techniques to preprocess the text metadata associated with the images of the historical image data and/or the text of the historical text data. The one or more text processing techniques may include a technique to convert text to lowercase, a technique to remove punctuation from text, a lemmatization technique, a stemming technique, a stop words removal technique, and/or the like. For example, applying the lowercase technique and the stop words remove technique to text (e.g., Child, Alcoholism, Child neglect, Child abuse, Alcoholic Beverages, Addiction, Drinking, Childhood trauma, Psychological trauma, Driving, Motor vehicle, Vehicle, Center console, Transport, Steering wheel, Mode of Transport, and Steering part) may generate modified text (e.g., child, alcoholism, child_neglect, child_abuse, alcoholic_beverages, addiction, drinking, childhood_trauma, psychological_trauma, driving, motor_vehicle, vehicle, center_console, transport, steering_wheel, mode_transport, and steering_part). Applying the lemmatization technique and the stemming technique to the modified text may generate preprocessed text (e.g., child, alcohol, child_neglect, child_abus, alcohol_beverage, addict, drink, childhood_trauma, psycholog_trauma, drive, motor_vehicl, vehicl, center_consol, transport, steer_wheel, mode_transport, and steer_part).

As shown in FIG. 1B, and by reference number 110, the contextual analysis platform may identify objects included in the images of the historical image data and may apply tags to the identified objects. In some implementations, the contextual analysis platform may process the images of the historical image data, with computer vision techniques (e.g., an object detection technique, a scene recognition technique, and/or the like), to identify the objects included in the images and to apply tags to the identified objects. For example, a tag (e.g., child) may be applied to an image of a child, a tag (e.g., alcohol) may be applied to an image of a beer bottle, a tag (e.g., motor_vehicl) may be applied to an image of a car, a tag (e.g., steer_wheel) may be applied to an image of a steering wheel, and/or the like.

Figure 1C:
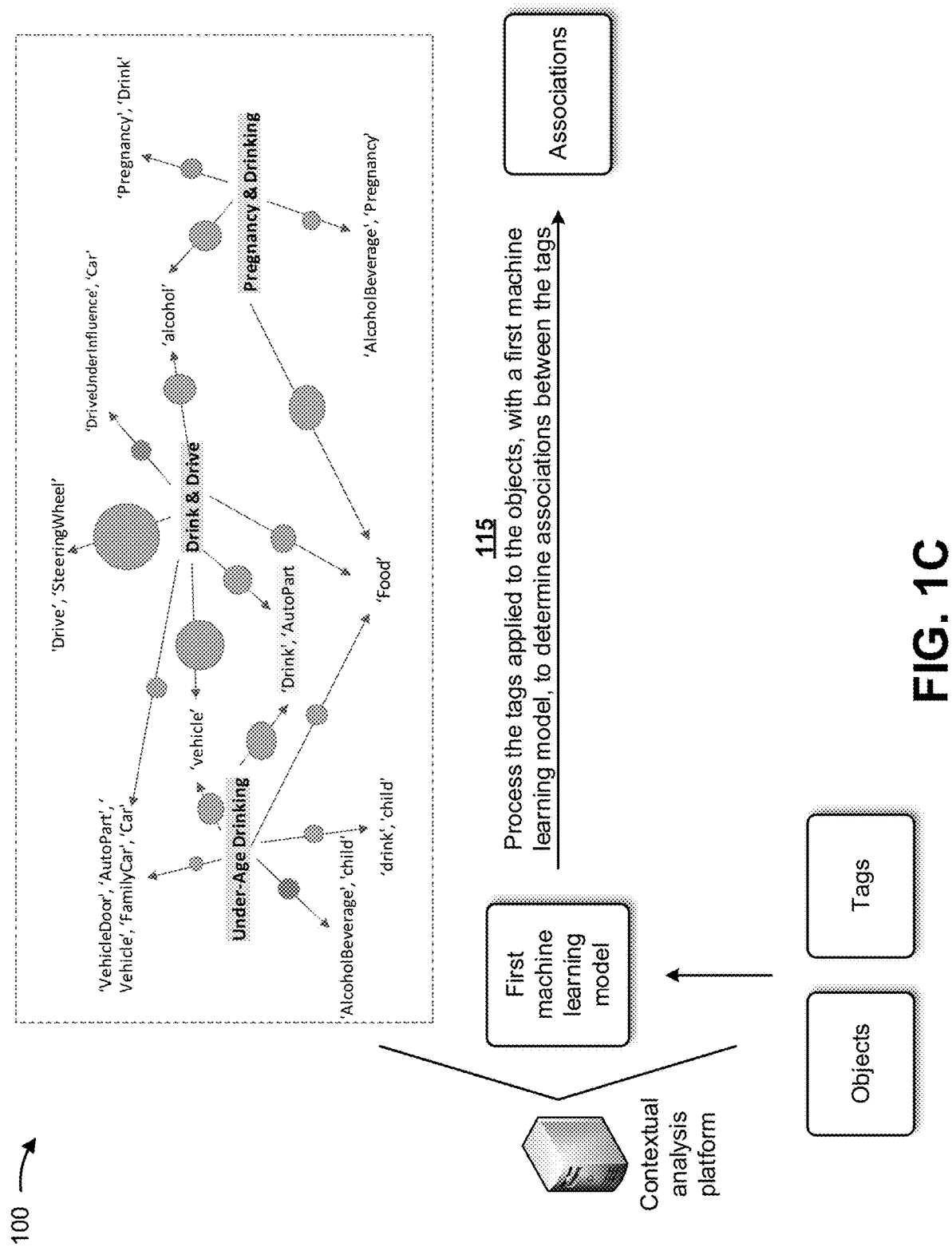

As shown in FIG. 1C, and by reference number 115, the contextual analysis platform may process the tags applied to the objects, with a first machine learning model, to determine associations between the tags. In some implementations, the first machine learning model may include an apriori model for rules mining that identifies associations between tags that indicate non-compliant content. The non-compliant content pertaining to a scenario or policy (e.g., drinking alcohol and driving) may be collected and the apriori model may be applied to pre-processed tags for such content. The contextual analysis platform may identify categories (e.g., scenarios and/or use cases that indicate non-compliant content) and context for the tags applied to the objects. The apriori model may identify context in images by determining associations in tags for a particular scenario (e.g., association of the tags child, alcohol, drinking implies non-compliance with respect to underage drinking). The apriori model may thus create a repository of context (e.g., or rules) for each of the categories (e.g., drink and drive, drinking and pregnancy, underage drinking, and/or the like).

In some implementations, the contextual analysis platform may vectorize each tag against the repository of context and may label each image, associated with each tag, as compliant or non-compliant. This may create a training set of data based on the associations between the tags. In some implementations, the contextual analysis platform may vectorize the tags applied to the objects using a one-hot-encoding technique to create a bag of rules and words that may be utilized to determine whether the images associated with the tags are compliant or non-compliant. For example, the contextual analysis platform may generate vectors for the tags in a table format, as shown below.

TABLE

| Tag | car | alcohol | wheel | drink | car + drink | Output |
|---|---|---|---|---|---|---|
| car, alcohol, drink, car + drink | 1 | 1 | 0 | 1 | 1 | Non-compliant |
| drink, child, trauma + addict | 0 | 0 | 0 | 1 | 0 | Non-compliant |
| pregnanc + alcohol, wine + food | 0 | 0 | 0 | 0 | 0 | Non-compliant |
| vehicl + automotive, car, wheel | 1 | 0 | 1 | 0 | 0 | Compliant |

In some implementations, the contextual analysis platform may utilize a contextual indexing graph, as shown at the top of FIG. 1C, to determine the associations between the tags and to determine whether the images associated with the tags are compliant or non-compliant. A contextual indexing graph may include a virtual representation of the apriori model. The contextual analysis platform may utilize a bounding box of objects recognized in the images to derive relationships between the objects (e.g., whether a hand of person is near an alcohol bottle, overlapping the bottle, or far from the bottle). Each context in the contextual indexing graph may include a flag that indicates whether context is compliant context or non-compliant context.

Figure 1D:
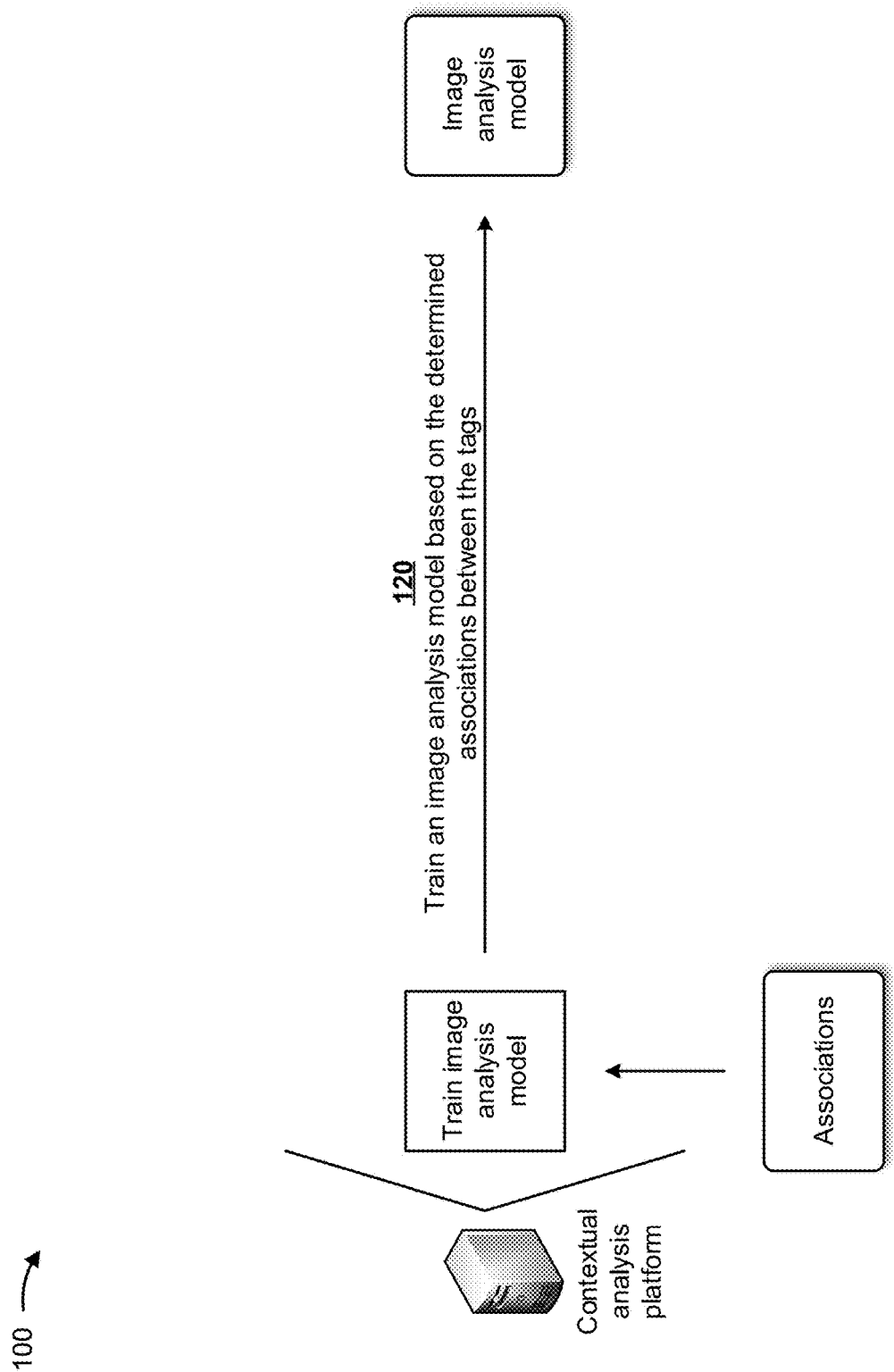

As shown in FIG. 1D, and by reference number 120, the contextual analysis platform may train an image analysis model based on the determined associations between the tags. In some implementations, the image analysis model may determine an image compliance score associated with image data (e.g., which indicates whether an image is compliant or non-compliant), as described below. The image compliance score may be associated with a policy and with context of the image data. In some implementations, the image analysis model may include a logistic regression model, a gradient boost model, a random forest model, a multinomial naïve Bayesian model, a neural network model, and/or the like. In some implementations, the contextual analysis platform may utilize a stratified five-fold cross validation technique to select a best fit model from multiple machine learning models (e.g., the logistic regression model, the gradient boost model, the random forest model, the multinomial naïve Bayesian model, the neural network model, and/or the like). The contextual analysis platform may train the best fit model (e.g., the image analysis model) based on the determined associations between the tags.

In some implementations, the contextual analysis platform may train the image analysis model with historical data (e.g., the determined associations between the tags) to generate a trained image analysis model. The contextual analysis platform may separate the historical data into a training set, a validation set, a test set, and/or the like. The training set may be utilized to train the image analysis model. The validation set may be utilized to validate results of the trained image analysis model. The test set may be utilized to test operation of the trained image analysis model.

In some implementations, the contextual analysis platform may train the image analysis model using, for example, an unsupervised training procedure and based on the historical data. For example, the contextual analysis platform may perform dimensionality reduction to reduce the historical data to a minimum feature set, thereby reducing resources (e.g., processing resources, memory resources, and/or the like) to train the image analysis model, and may apply a classification technique to the minimum feature set.

In some implementations, the contextual analysis platform may use a logistic regression classification technique to determine a categorical outcome (e.g., compliant images and non-compliant images). Additionally, or alternatively, the contextual analysis platform may use a naïve Bayesian classifier technique. In this case, the contextual analysis platform may perform binary recursive partitioning to split the historical data into partitions and/or branches, and use the partitions and/or branches to determine outcomes (e.g., compliant images and non-compliant images). Based on using recursive partitioning, the contextual analysis platform may reduce utilization of computing resources relative to manual, linear sorting and analysis of data points, thereby enabling use of thousands, millions, or billions of data points to train the image analysis model, which may result in more accurate models than using fewer data points.

Additionally, or alternatively, the contextual analysis platform may use a support vector machine (SVM) classifier technique to generate a non-linear boundary between data points in the training set. In this case, the non-linear boundary is used to classify test data into a particular class.

Additionally, or alternatively, the contextual analysis platform may train the image analysis model using a supervised training procedure that includes receiving input to the image analysis model from a subject matter expert, which may reduce an amount of time, an amount of processing resources, and/or the like to train the image analysis model relative to an unsupervised training procedure.

In some implementations, the contextual analysis platform may use one or more other model training techniques, such as a latent semantic indexing technique, and/or the like. For example, the contextual analysis platform may perform an artificial neural network processing technique (e.g., using a two-layer feedforward neural network architecture, a three-layer feedforward neural network architecture, and/or the like) to perform pattern recognition with regard to patterns of the historical data. In this case, using the artificial neural network processing technique may improve an accuracy of the trained image analysis model generated by the contextual analysis platform by making the model more robust to noisy, imprecise, or incomplete data, and by enabling the contextual analysis platform to detect patterns and/or trends undetectable to human analysts or systems using less complex techniques.

In some implementations, rather than training the image analysis model, the contextual analysis platform may obtain the trained image analysis model from another system or device that trained the image analysis model to generate the trained image analysis model. In this case, the contextual analysis platform may provide the other system or device with the historical data for use in training the image analysis model, and may provide the other system or device with updated historical data to retrain the image analysis model in order to update the trained image analysis model.

Figure 1E:
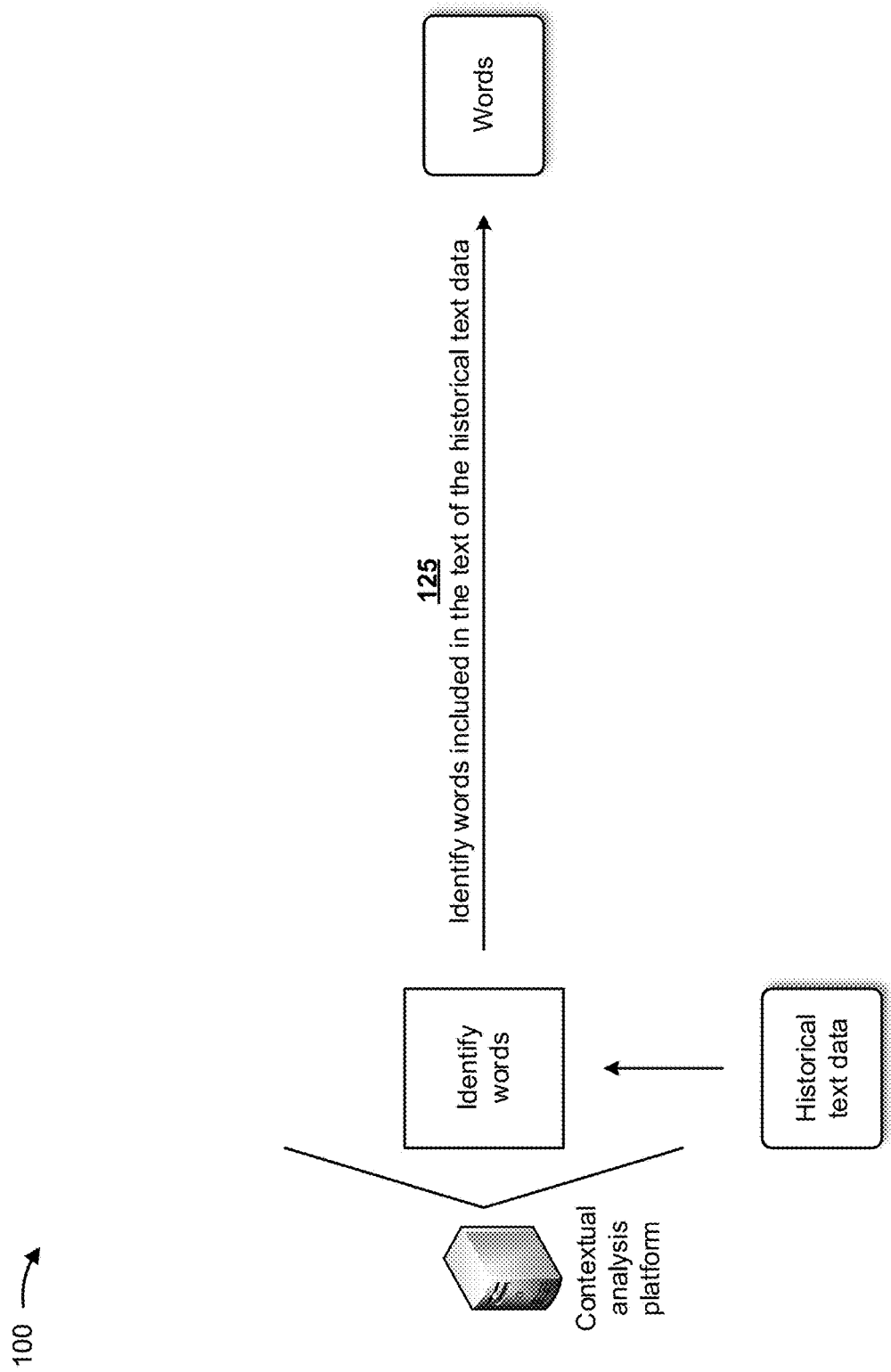

As shown in FIG. 1E, and by reference number 125, the contextual analysis platform may identify words included in the text of the historical text data. In some implementations, the contextual analysis platform may identify words or groups of words (e.g., sentences) in the text of the historical text data. The words or groups of words may be in the format of tags based on preprocessing the historical text data, as described above. For example, the words or groups of words may be in the format of tags, such as motor_vehicl, vehicl, center_consol, transport, steer_wheel, mode_transport, steer_part, and/or the like.

Figure 1F:
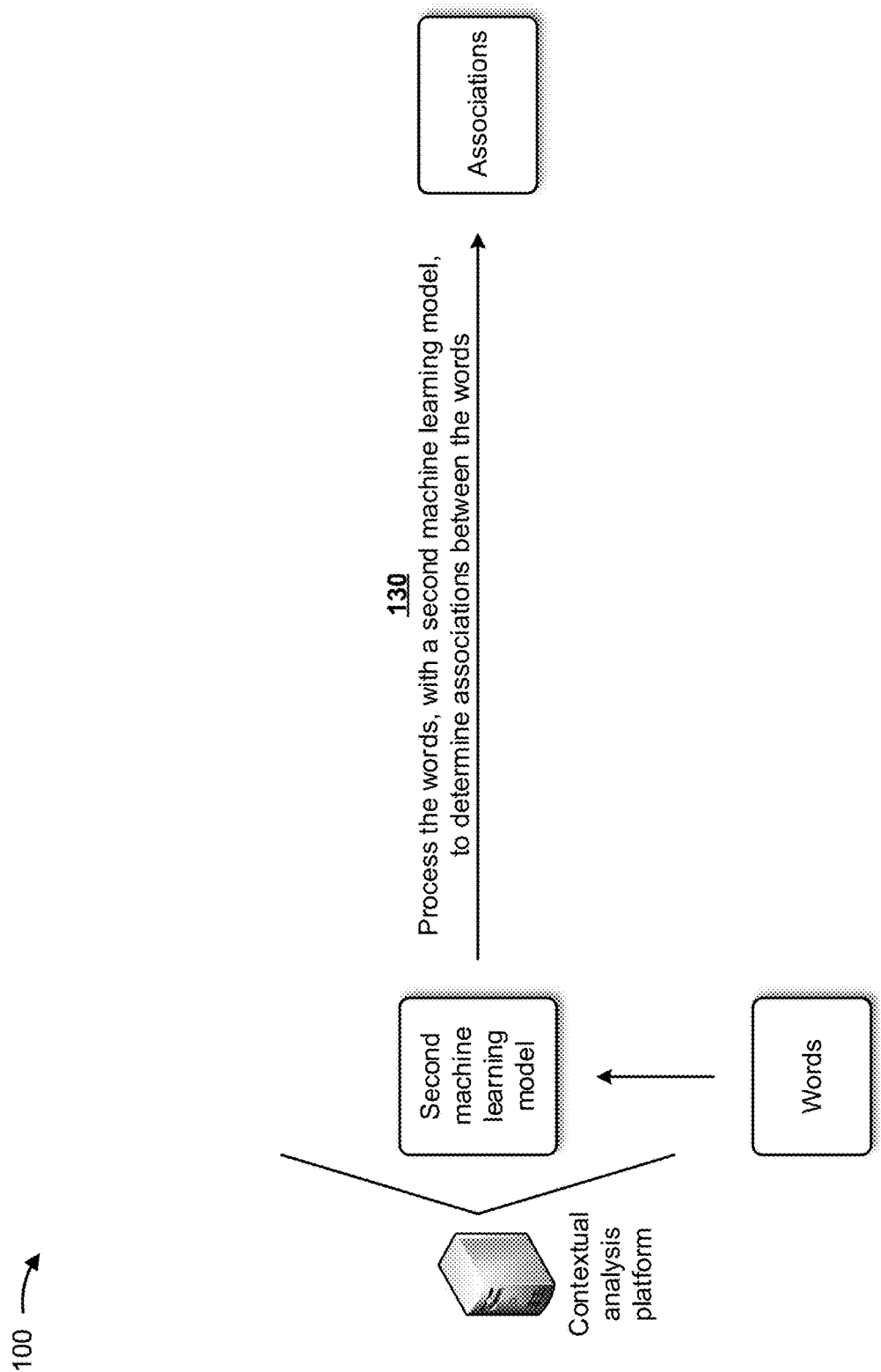

As shown in FIG. 1F, and by reference number 130, the contextual analysis platform may process the words, with a second machine learning model, to determine associations between the words. In some implementations, the second machine learning model may include an apriori model for rules mining that identifies associations between words that indicate non-compliant content. The contextual analysis platform may identify categories (e.g., scenarios and/or use cases that indicate non-compliant content) and context for the words. The apriori model may thus create a repository of context (e.g., or rules) for each of the categories (e.g., drink and drive, drinking and pregnancy, underage drinking, and/or the like).

In some implementations, the contextual analysis platform may vectorize each word against the repository of context and may label each word as compliant or non-compliant. This may create a training set of data based on the associations between the words. In some implementations, the contextual analysis platform may vectorize the words using a one-hot-encoding technique to create a bag of rules and words that may be utilized to determine whether the words are compliant or non-compliant. For example, the contextual analysis platform may generate vectors for the words in a table format, as described above. In some implementations, the contextual analysis platform may utilize a contextual indexing graph, as shown at the top of FIG. 1C, to determine the associations between the words and to determine whether text associated with the words is compliant or non-compliant.

Figure 1G:
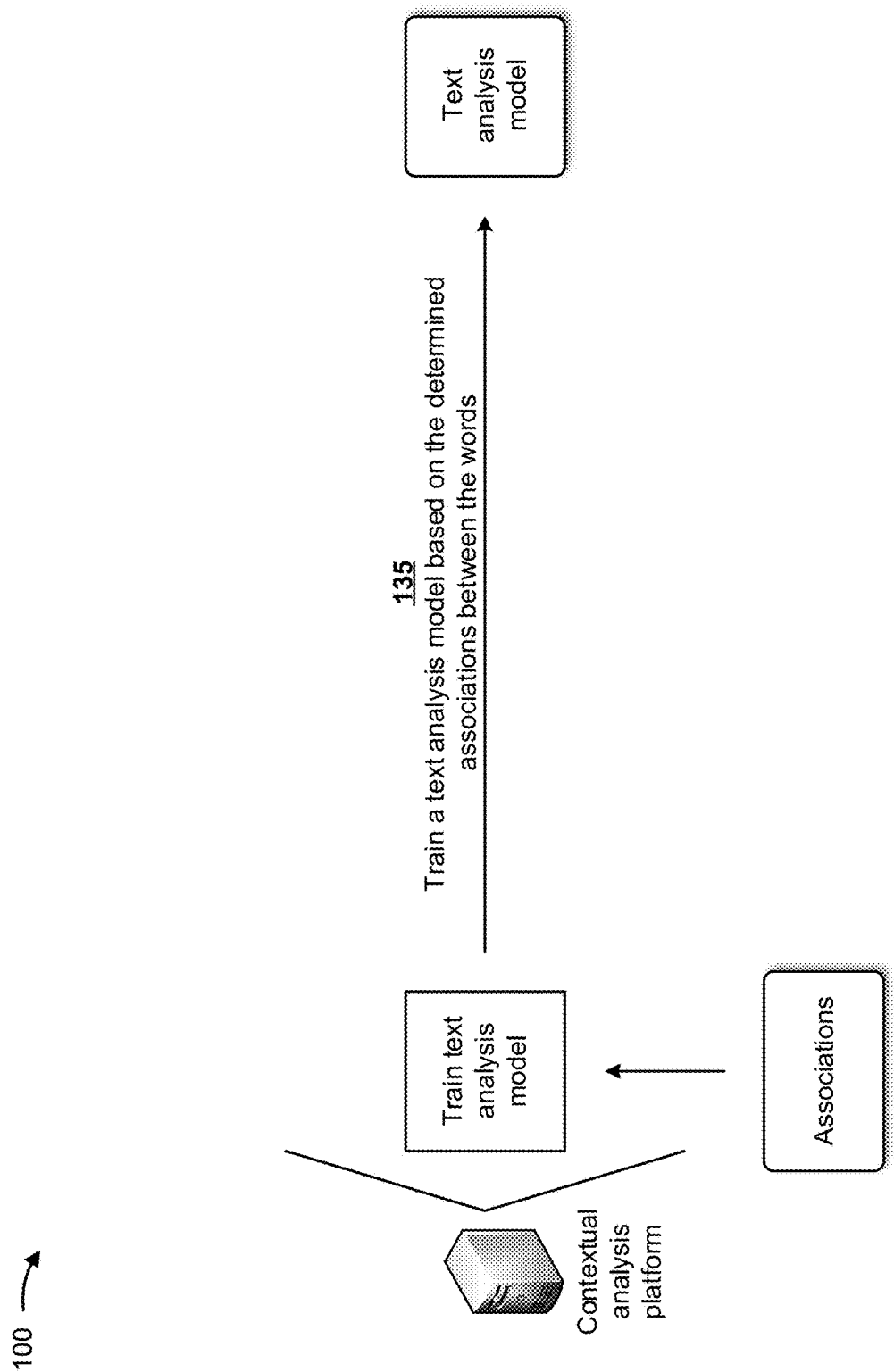

As shown in FIG. 1G, and by reference number 135, the contextual analysis platform may train a text analysis model based on the determined associations between the words. In some implementations, the text analysis model may determine a text compliance score associated with text data (e.g., which indicates whether text is compliant or non-compliant), as described below. The text compliance score may be associated with a policy and with context of the text data. In some implementations, the text analysis model may include a logistic regression model, a gradient boost model, a random forest model, a multinomial naïve Bayesian model, a neural network model, and/or the like. In some implementations, the contextual analysis platform may utilize a stratified five-fold cross validation technique to select a best fit model from multiple machine learning models (e.g., the logistic regression model, the gradient boost model, the random forest model, the multinomial naïve Bayesian model, the neural network model, and/or the like). The contextual analysis platform may train the best fit model (e.g., the text analysis model) based on the determined associations between the words.

Figure 1H:
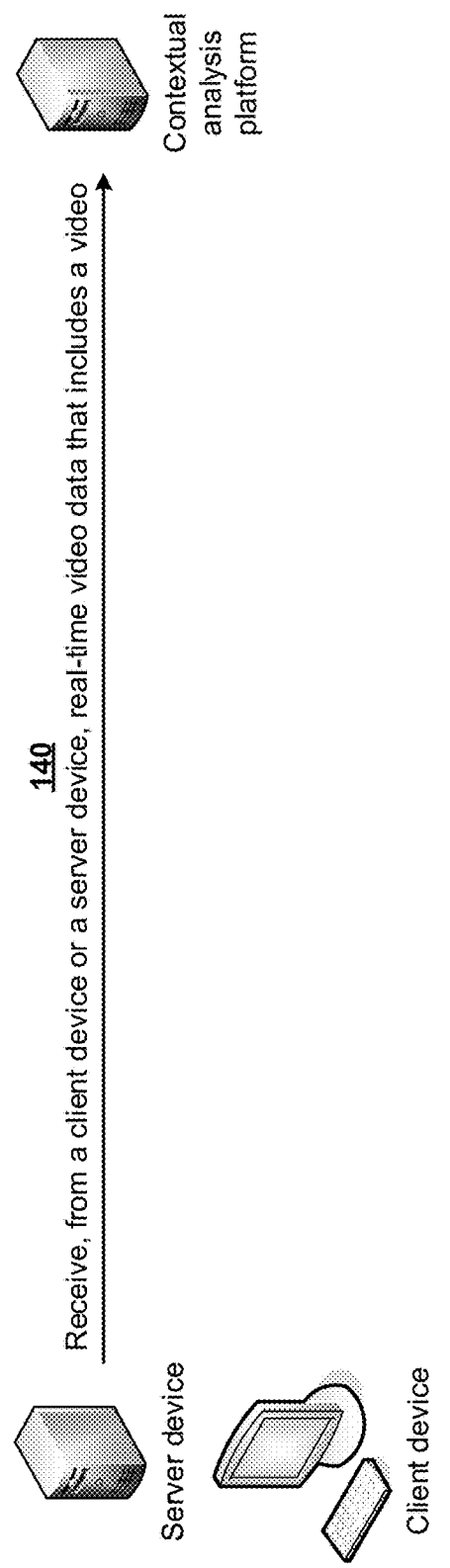

As shown in FIG. 1H, and by reference number 140, the contextual analysis platform may receive, from a client device or a server device, real-time video data that includes a video. In some implementations, the video may include multiple images (e.g., frames) and may be provided by the client device to the server device. The server device may be a content platform that hosts content online, and may provide the real-time video data to the contextual analysis platform in real-time or near-real time relative to when the video is received from the client device. In some implementations, the context analysis platform may receive tens, hundreds, thousands, and/or the like of real-time video data from tens, hundreds, thousands, and/or the like server devices. Thus, the contextual analysis platform may handle thousands, millions, billions, and/or the like, of data records within a period of time (e. g., daily, weekly, monthly), and thus may provide big data capability. The contextual analysis platform may store the real-time video data in a data structure (e.g., a database, a table, a list, and/or the like) associated with the contextual analysis platform.

As shown in FIG. 1I, and by reference number 145, the contextual analysis platform may identify image data associated with the real-time video data. In some implementations, the image data may correspond to one or more frames of the video included in the real-time video data. In such implementations, the contextual analysis platform may process the video, with a video-to-image converter technique, to convert the video into the one or more frames of the video. The contextual analysis platform may store the image data in a data structure (e.g., a database, a table, a list, and/or the like) associated with the contextual analysis platform.

Figure 1J:
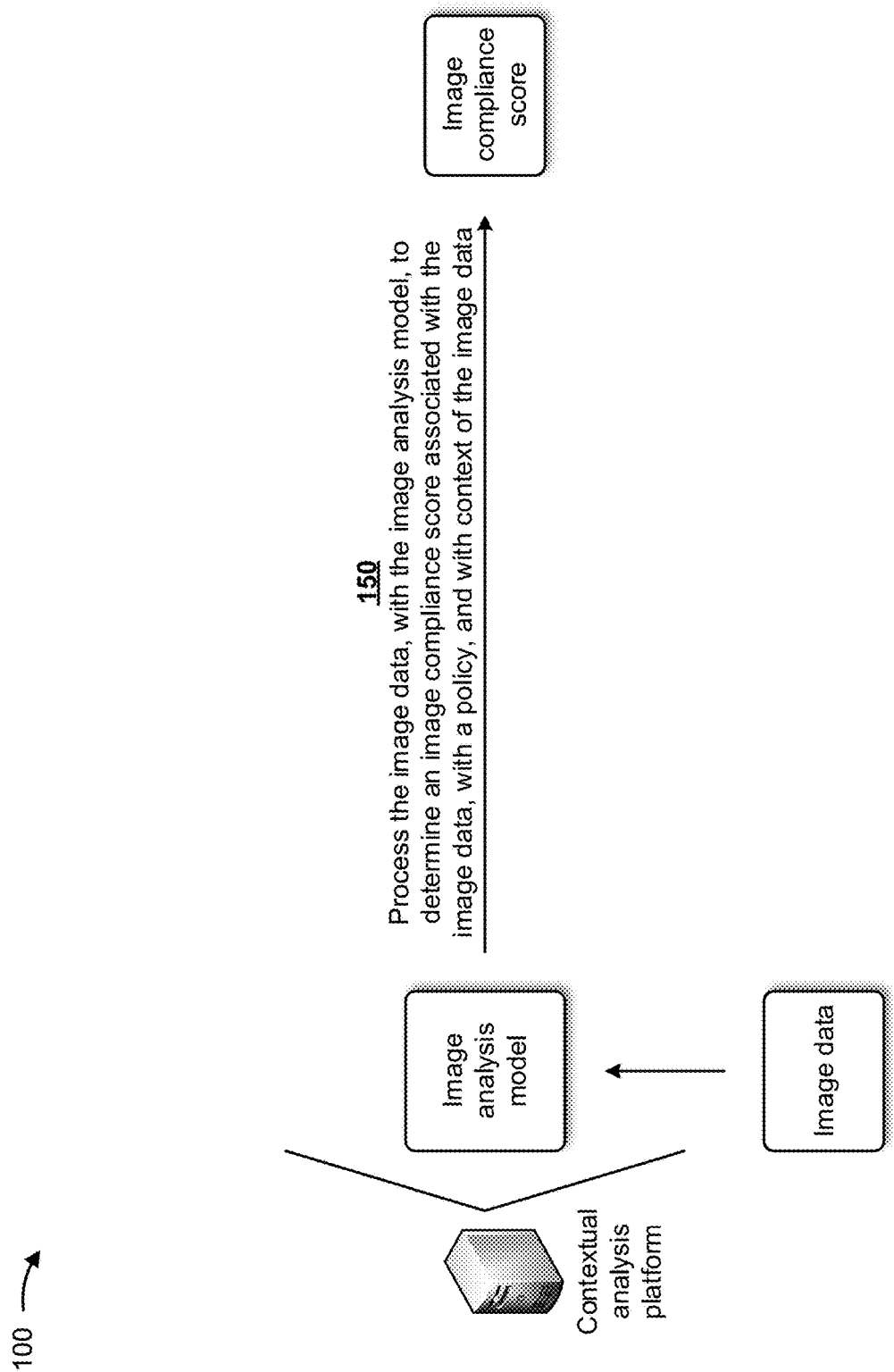

As shown in FIG. 1J, and by reference number 150, the contextual analysis platform may process the image data, with the image analysis model, to determine an image compliance score associated with the image data, with a policy, and with context of the image data. In some implementations, the policy may include a policy defined by an entity associated with the server device (e.g., a social media service provider) and may specify rules for content that is non-compliant (e.g., and should be rejected) and rules for content that is compliant (e.g., and should be approved).

In some implementations, the contextual analysis platform may identify objects included in the one or more frames of the video included in image data and may apply tags to the identified objects, as described above in connection with FIG. 1B. The contextual analysis platform may determine associations between the tags, as described above in connection with FIG. 1C. The contextual analysis platform may process the associations between the tags, with the image analysis model, to determine the image compliance score associated with the image data, with the policy, and with the context of the image data.

In some implementations, the image analysis model may match the associations with policy rules identifying non-compliant content. Based on matching the associations with policy rules identifying non-compliant content and policy rules identifying compliant content, the image analysis model may determine an image compliance score for a strong match, an image compliance score for a partial match, or an image compliance score for a negligible match. The image compliance score for the strong match with a user case may indicate that the associations between the tags of the image data have a strong match with non-compliant content or compliant content. The image compliance score for the partial match with a use case may indicate that the associations between the tags of the image data have a partial match with non-compliant content or compliant content. The image compliance score for the negligible match may indicate that the associations between the tags of the image data do not match with any non-compliant use case/scenario and that the image may be assumed to be compliant.

Figure 1K:
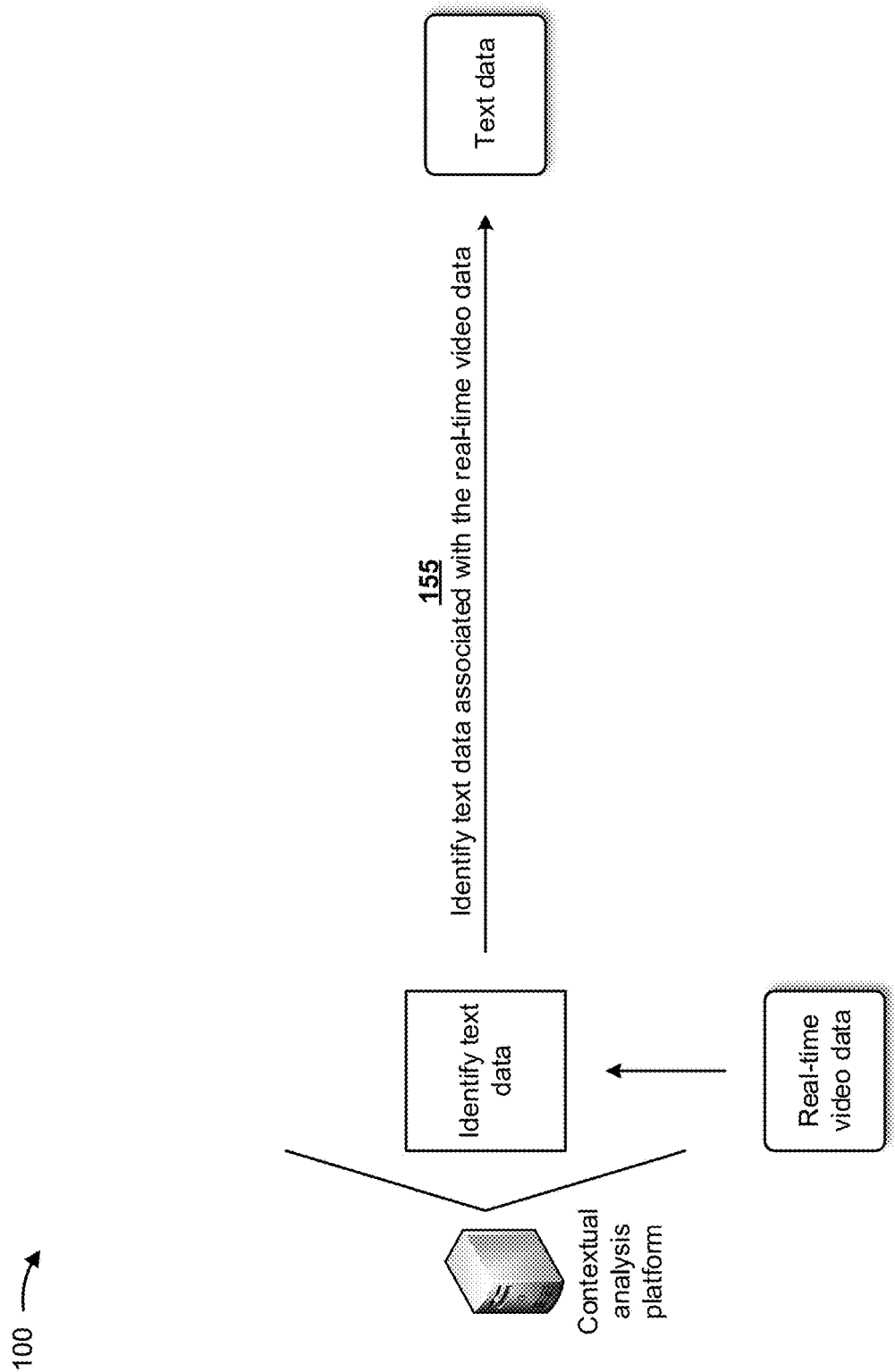

As shown in FIG. 1K, and by reference number 155, the contextual analysis platform may identify text data associated with the real-time video data. In some implementations, the text data may correspond to text of speech spoken in the video, text displayed in the video, textual metadata included with the video, and/or the like. In such implementations, the contextual analysis platform may process the video, with a speech-to-text model, to convert the speech spoken in the video into text data. The contextual analysis platform may also process the video, with an optical character recognition model, to convert text displayed in the video into text data. The contextual analysis platform may store the text data in a data structure (e.g., a database, a table, a list, and/or the like) associated with the contextual analysis platform.

Figure 1L:
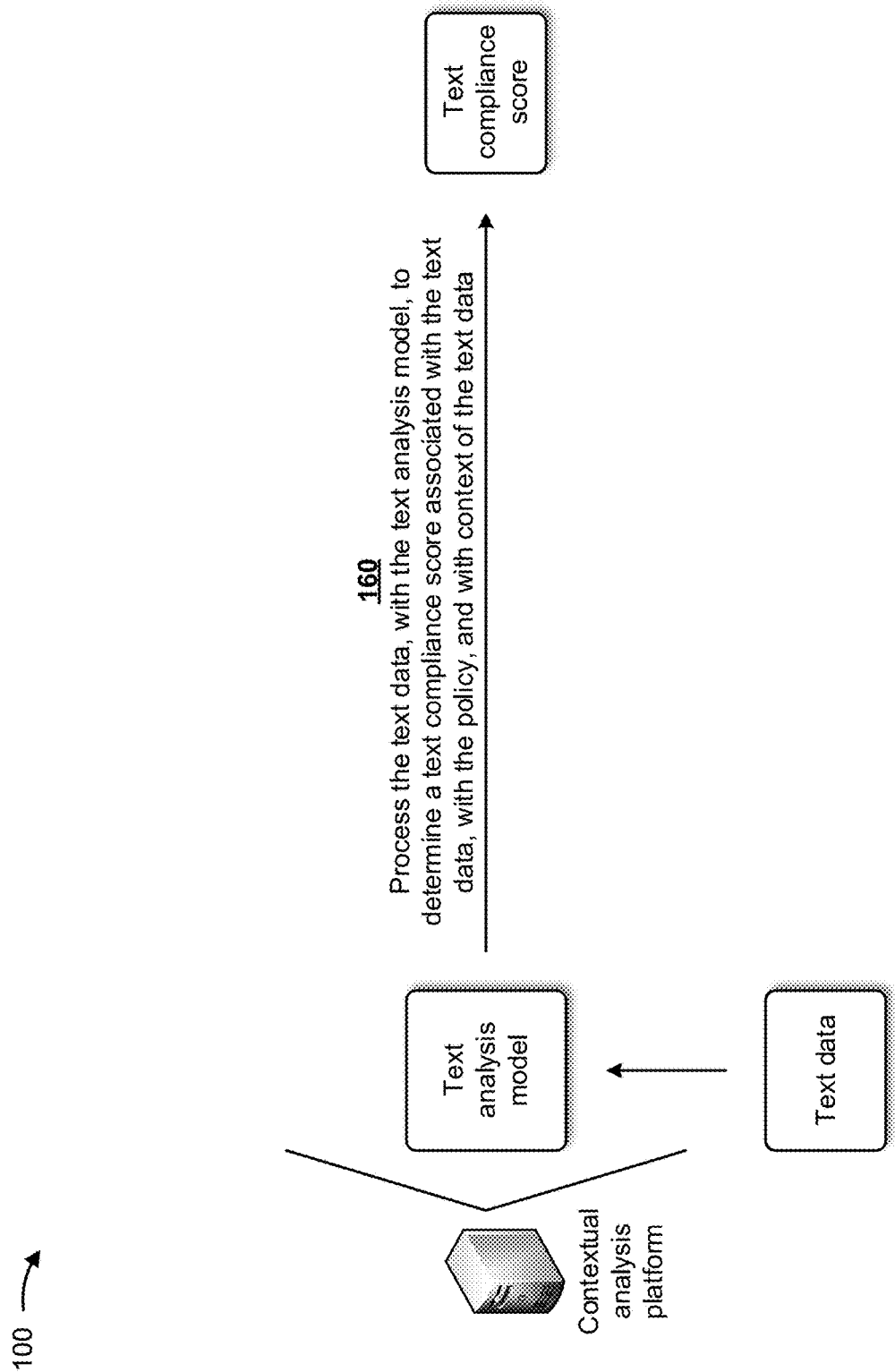

As shown in FIG. 1L, and by reference number 160, the contextual analysis platform may process the text data, with the text analysis model, to determine a text compliance score associated with the text data, with the policy, and with context of the text data. In some implementations, the contextual analysis platform may identify words in the text included in the text data, as described above in connection with FIG. 1E. The contextual analysis platform may determine associations between the words, as described above in connection with FIG. 1F. The contextual analysis platform may process the associations between the words, with the text analysis model, to determine the text compliance score associated with the text data, with the policy, and with the context of the text data.

In some implementations, the text analysis model may match the associations with policy rules identifying non-compliant content and policy rules identifying compliant content. Based on matching the associations with policy rules identifying non-compliant content and policy rules identifying compliant content, the image analysis model may determine a text compliance score for a strong match, a text compliance score for a partial match, or a text compliance score for a negligible match. The text compliance score for the strong match may indicate that the associations between the words of the text data have a strong match with non-compliant content or compliant content. The text compliance score for the partial match may indicate that the associations between the words of the text data have a partial match with non-compliant content or compliant content. The text compliance score for the negligible match may indicate that the associations between the words of the text data do not match non-compliant content or compliant content.

Figure 1M:
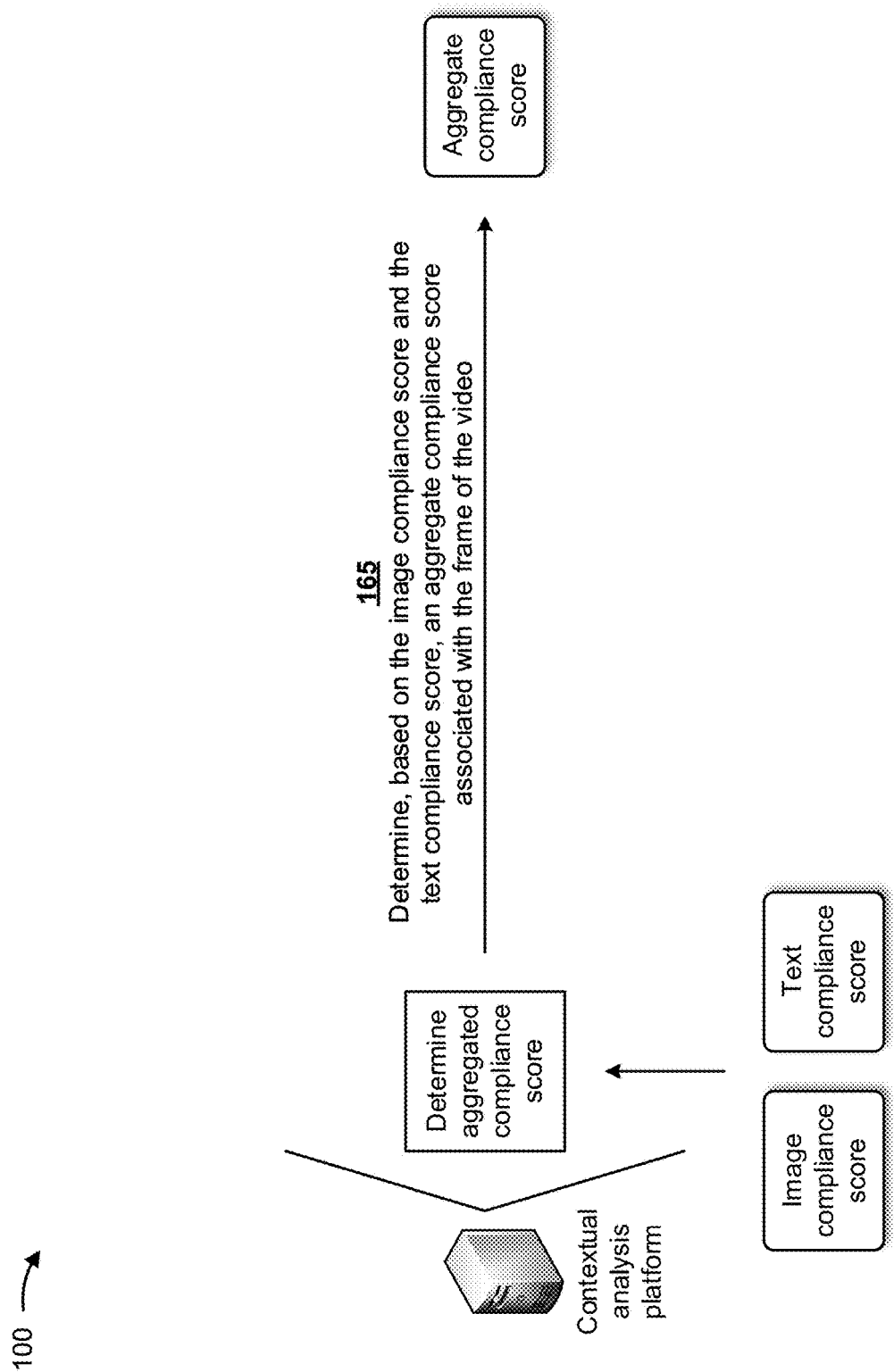

As shown in FIG. 1M, and by reference number 165, the contextual analysis platform may determine, based on the image compliance score and the text compliance score, an aggregate compliance score associated with the frame of the video. In some implementations, the aggregate compliance score may include an average of the image compliance score and the text compliance score, a ratio of the image compliance score and the text compliance score, a summation of the image compliance score and the text compliance score, and/or the like. Alternatively, or additionally, the contextual analysis platform may apply weights to the image compliance score and the text compliance score, and may determine the aggregate compliance score as a weighted average of the image compliance score and the text compliance score.

In some implementations, the image data may be associated with a first timestamp (e.g., a one minute mark of the video), the text data may be associated a second timestamp, and the first timestamp of the image data may be within a threshold time period from the second timestamp of the text data. In such implementations, the contextual analysis platform may determine the aggregate compliance score based on the image compliance score and the text compliance score only when the first timestamp of the image data is within the threshold time period from the second timestamp of the text data. In some implementations, the contextual analysis platform may determine a time difference between the first timestamp and the second timestamp, and may determine the aggregate compliance score based on the time difference. In this way, the contextual analysis platform will aggregate an image compliance score and a text compliance score that are temporally similar.

In some implementations, the contextual analysis platform may process a visual and audio stream separately to provide a set of image context and text context (e.g., where audio is converted to text) respectively against each timestamp. The contextual analysis platform may perform a rule-based mapping of each text versus image context and to determine whether the aggregated context is compliant or non-compliant. For example, at a point in time a person may be smoking cigarette but after five minutes there may be an audio warning that states, "smoking is dangerous to your health." In such an example, the audio warning may negate the appearance of the person smoking the cigarette and the aggregate compliance score may become neutral (e.g., a time difference may not matter).

Figure 1N:
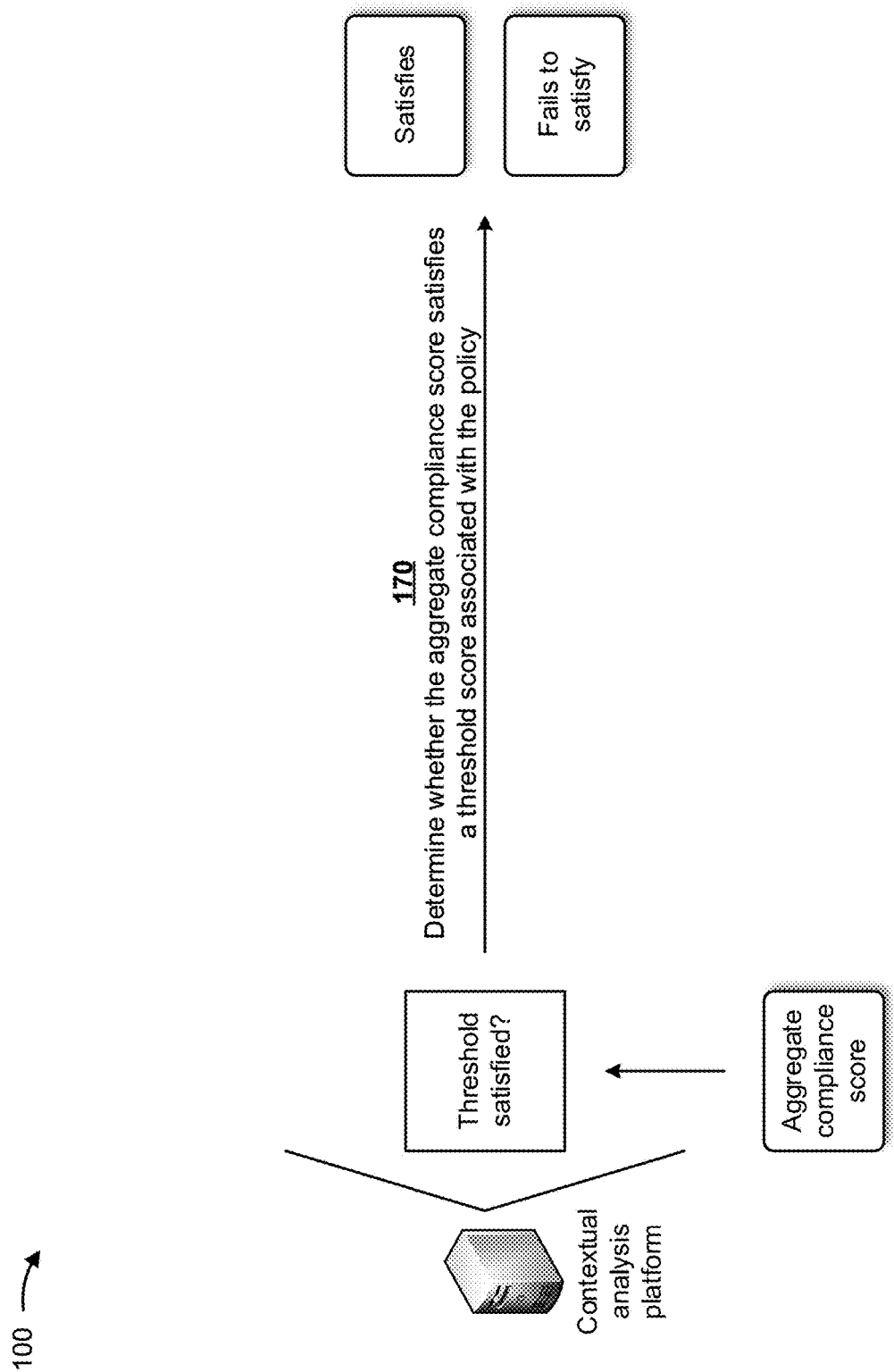
Figure 10:
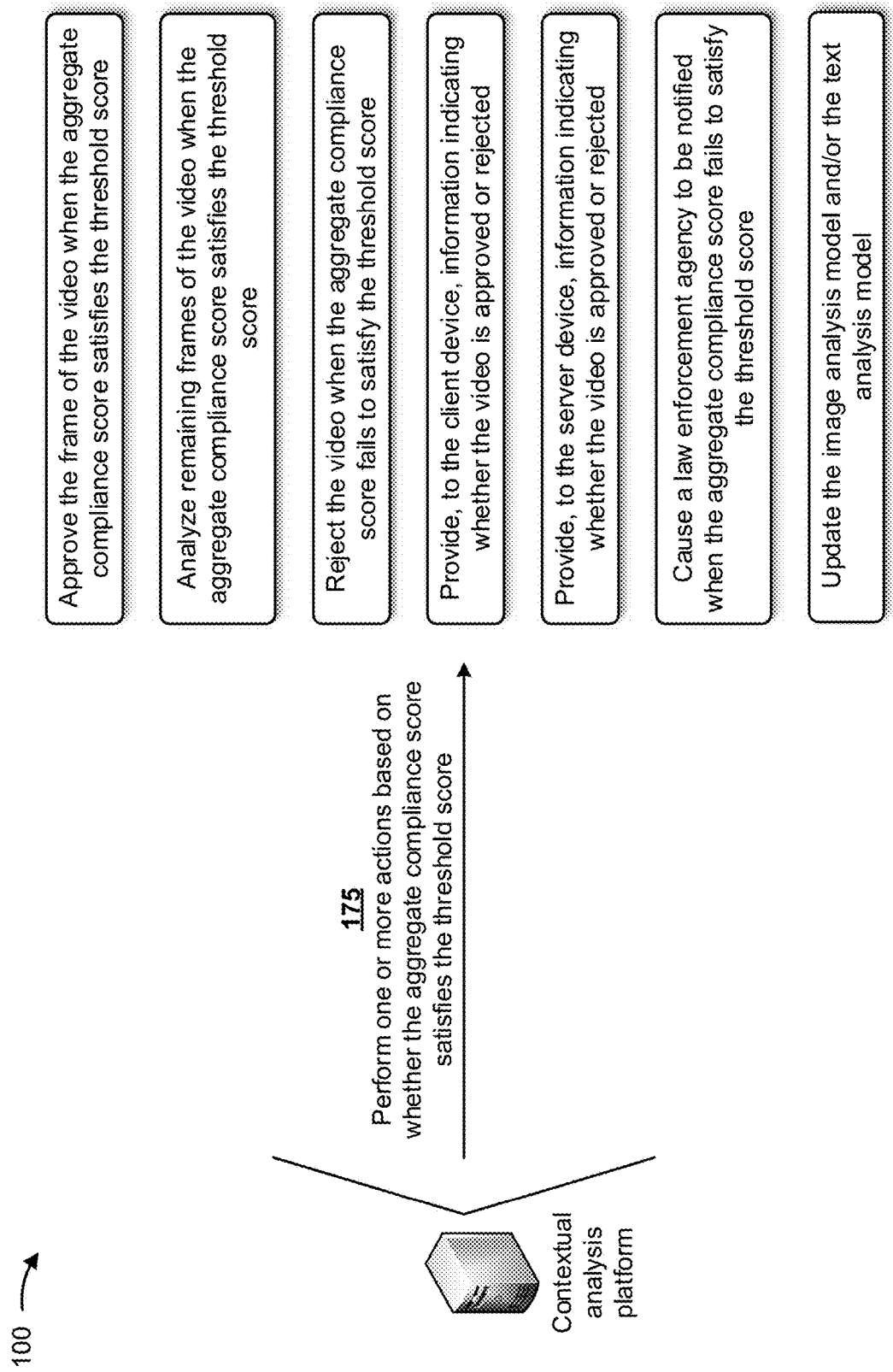

As shown in FIG. 1N, and by reference number 170, the contextual analysis platform may determine whether the aggregate compliance score satisfies a threshold score associated with the policy. For example, if the policy specifies the threshold score for compliant content and the aggregate compliance score satisfies the threshold score, the contextual analysis platform may determine that the video is compliant with the policy (e.g., or at least the one or more frames of the video are compliant with the policy). If the aggregate compliance score fails to satisfy the threshold score, the contextual analysis platform may determine that the video is non-compliant with the policy (e.g., or at least the one or more frames of the video are non-compliant with the policy). Alternatively, if the policy specifies the threshold score for non-compliant content and the aggregate compliance score satisfies the threshold score, the contextual analysis platform may determine that the video is non-compliant with the policy (e.g., or at least the one or more frames of the video are non-compliant with the policy). If the aggregate compliance score fails to satisfy the threshold score, the contextual analysis platform may determine that the video is compliant with the policy (e.g., or at least the one or more frames of the video are compliant with the policy). In some implementations, the contextual analysis platform may determine whether the aggregate compliance score satisfies a threshold score associated with the policy in real time or near-real time relative to when the video is received.

As shown in FIG. 1O, and by reference number 175, the contextual analysis platform may perform one or more actions based on whether the aggregate compliance score satisfies the threshold score. In some implementations, the contextual analysis platform may perform the one or more actions within a threshold time period (e.g., in real time or near-real time) of the video being received by the contextual analysis platform.

In some implementations, the one or more actions may include the contextual analysis platform approving the frame of the video when the aggregate compliance score satisfies the threshold score. For example, the contextual analysis platform may determine that the frame of the video is compliant with the policy when the aggregate compliance score satisfies the threshold score, and may approve the frame of the video, or the video, based on the determination. In this way, the contextual analysis platform may enable the server device to quickly determine compliance of the video, thereby conserving computing resources (e.g., processing resources, memory resources, communication resources, and/or the like), networking resources, and/or the like that would otherwise be wasted incorrectly determining compliance of the video, addressing legal actions due to posting non-compliant content, and/or like.

In some implementations, the one or more actions may include the contextual analysis platform analyzing remaining frames of the video when the aggregate compliance score satisfies the threshold score. For example, the contextual analysis platform may continue analyzing the video when the frame of the video satisfies the threshold score (e.g., is compliant). In this way, the contextual analysis platform may only continue analyzing the video when frames are compliant and may cease analyzing the video when a non-compliant frame is encountered, which may conserve computing resources, networking resources, and/or the like that would otherwise be wasted completely analyzing a video that includes multiple non-compliant frames.

In some implementations, the one or more actions may include the contextual analysis platform rejecting the video when the aggregate compliance score fails to satisfy the threshold score. For example, if the frame of the video is non-compliant, the aggregate compliance score may fail to satisfy the threshold score and the contextual analysis platform may cease analyzing the video. In this way, the contextual analysis platform may cease analyzing the video when a non-compliant frame is encountered, which may conserve computing resources, networking resources, and/or the like that would otherwise be wasted completely analyzing a video that includes multiple non-compliant frames.

In some implementations, the one or more actions may include the contextual analysis platform providing, to the client device, information indicating whether the video is approved or rejected. For example, the contextual analysis platform may provide, to the client device, a user interface that includes information indicating whether the video is approved or rejected, the aggregate compliance score of the video, and/or the like. In this way, the user of the client device may quickly receive a determination of whether the video will be posted online (e.g., by the server device), which may conserve resources that would otherwise be wasted in waiting for a decision about posting the video online, handling communications from a user of the client device about the video posting, and/or the like.

In some implementations, the one or more actions may include the contextual analysis platform causing a law enforcement agency to be notified when the aggregate compliance score fails to satisfy the threshold score. For example, if the contextual analysis platform identifies the video as violating a law (e.g., a decency law), the contextual analysis platform may automatically inform a law enforcement agency about the video. In this way, the contextual analysis platform may notify the law enforcement agency immediately and may enable the law enforcement agency to respond quickly (e.g., before the video is removed), which may conserve resources that would otherwise be wasted with arranging for the law enforcement agency to review the video, having the law enforcement agency attempt to recover the video if the video is removed, and/or the like.

In some implementations, the one or more actions may include the contextual analysis platform retraining the image analysis model and/or the text analysis model based on whether the aggregate compliance score satisfies the threshold score. In this way, the contextual analysis platform may improve the accuracy of the image analysis model and/or the text analysis model in processing image data and/or text data associated with videos, which may improve speed and efficiency of the image analysis model and/or the text analysis model and may conserve computing resources, networking resources, and/or the like.

In this way, several different stages of the process for identifying context of content for policy compliance determination are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes machine learning models to identify context of content for policy compliance determination in the manner described herein. Finally, the process for utilizing machine learning models to identify context of content for policy compliance determination conserves computing resources, networking resources, and/or the like that would otherwise be wasted in incorrectly determining compliance of content, handling legal actions associated with posting non-compliant content, removing the non-compliant content, and/or like.

As indicated above, FIGS. 1A-1O are provided merely as examples. Other examples may differ from what is described with regard to FIGS. 1A-1O.

Figure 2:
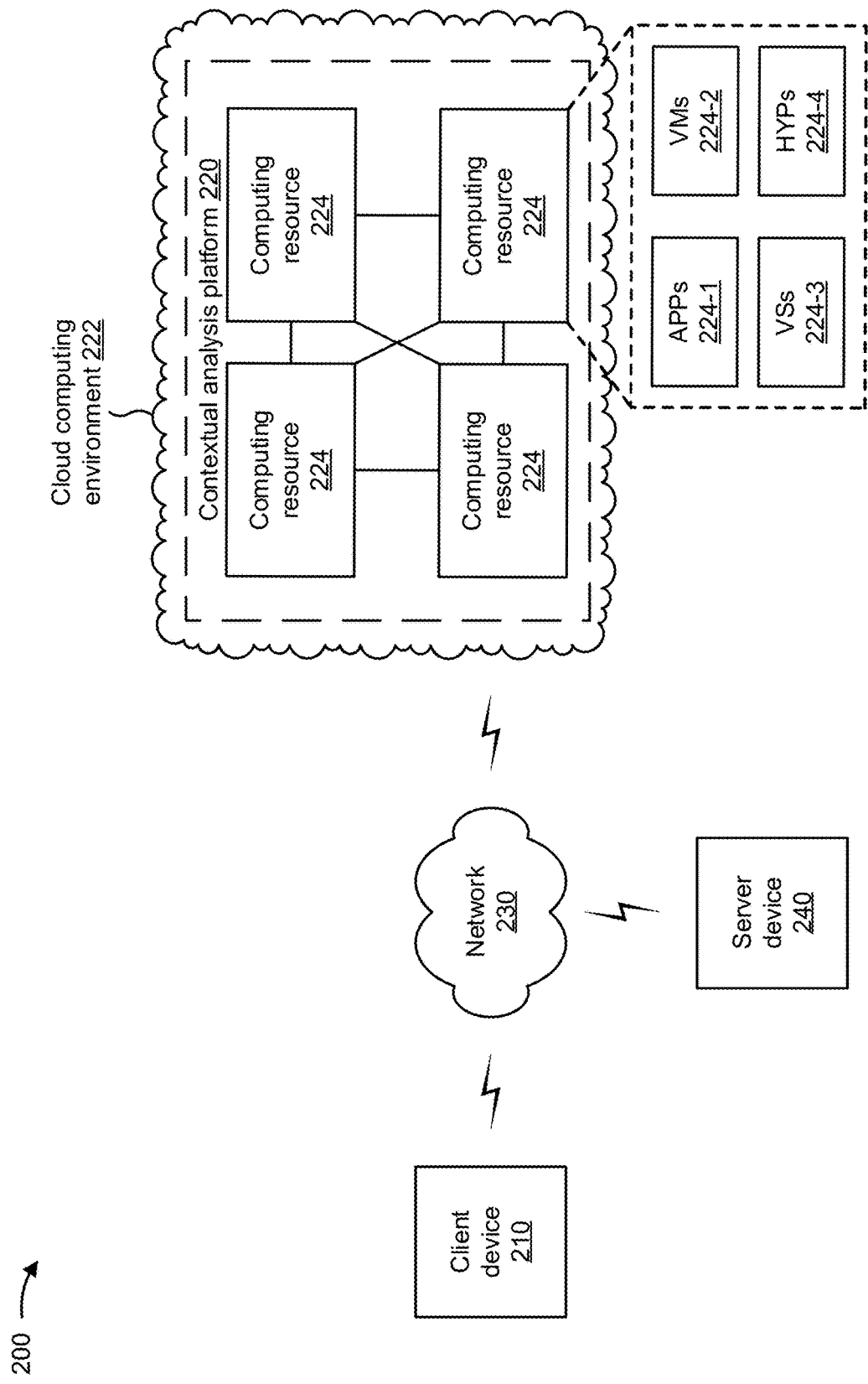
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a contextual analysis platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to contextual analysis platform 220 and/or server device 240.

Contextual analysis platform 220 includes one or more devices that utilize machine learning models to identify context of content for policy compliance determination. In some implementations, contextual analysis platform 220 may be designed to be modular such that certain software components may be swapped in or out depending on a particular need. As such, contextual analysis platform 220 may be easily and/or quickly reconfigured for different uses. In some implementations, contextual analysis platform 220 may receive information from and/or transmit information to one or more client devices 210 and/or server devices 240.

In some implementations, as shown, contextual analysis platform 220 may be hosted in a cloud computing environment 222. Notably, while implementations described herein describe contextual analysis platform 220 as being hosted in cloud computing environment 222, in some implementations, contextual analysis platform 220 may not be cloud-based (i.e., may be implemented outside of a cloud computing environment) or may be partially cloud-based.

Cloud computing environment 222 includes an environment that hosts contextual analysis platform 220. Cloud computing environment 222 may provide computation, software, data access, storage, etc., services that do not require end-user knowledge of a physical location and configuration of system(s) and/or device(s) that hosts contextual analysis platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host contextual analysis platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with contextual analysis platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of contextual analysis platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or contextual analysis platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
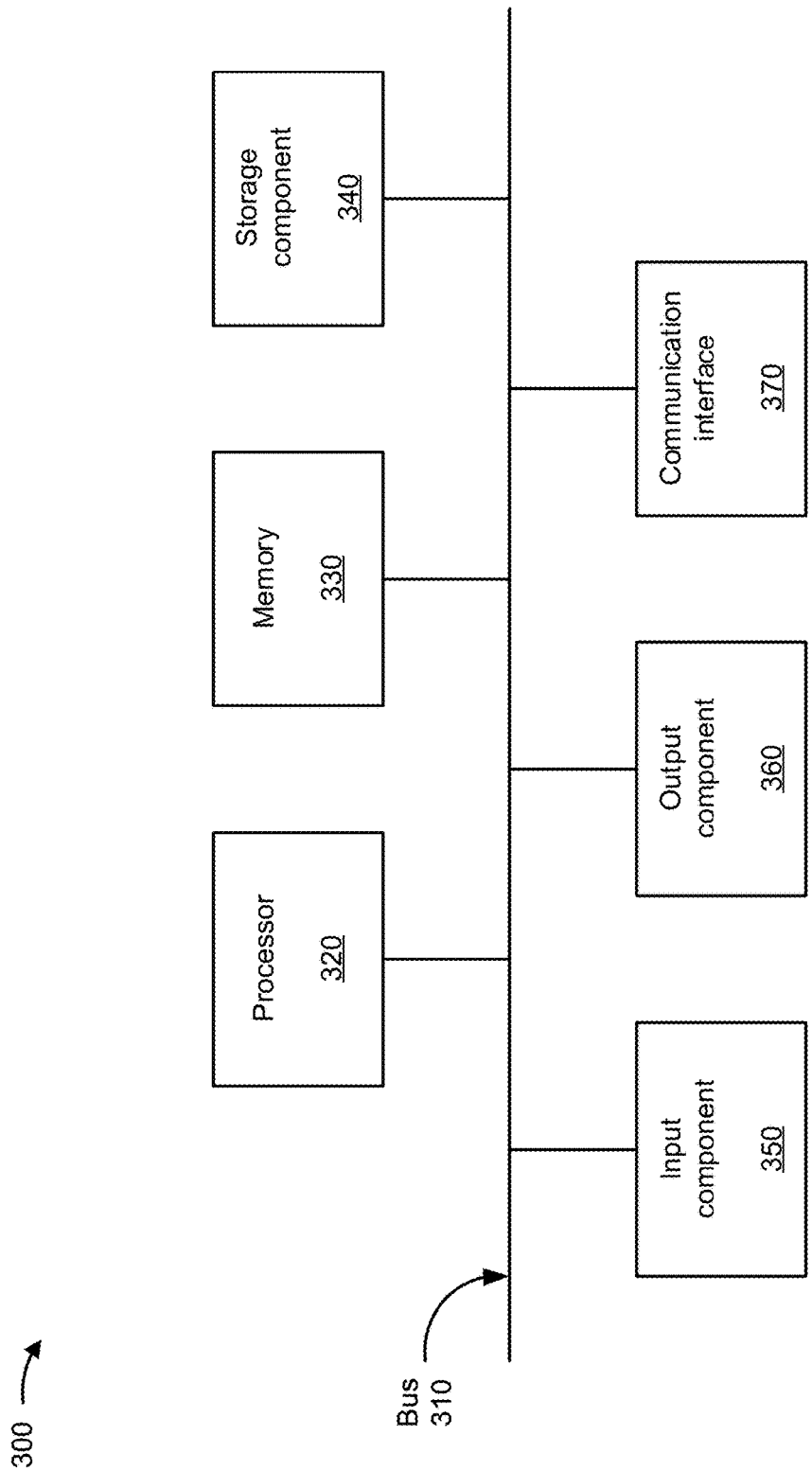
FIG. 3 is a diagram of example components of one or more devices of FIG. 2.

FIG. 3 is a diagram of example components of a device 300. Device 300 may correspond to client device 210, contextual analysis platform 220, computing resource 224, and/or server device 240. In some implementations, client device 210, contextual analysis platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
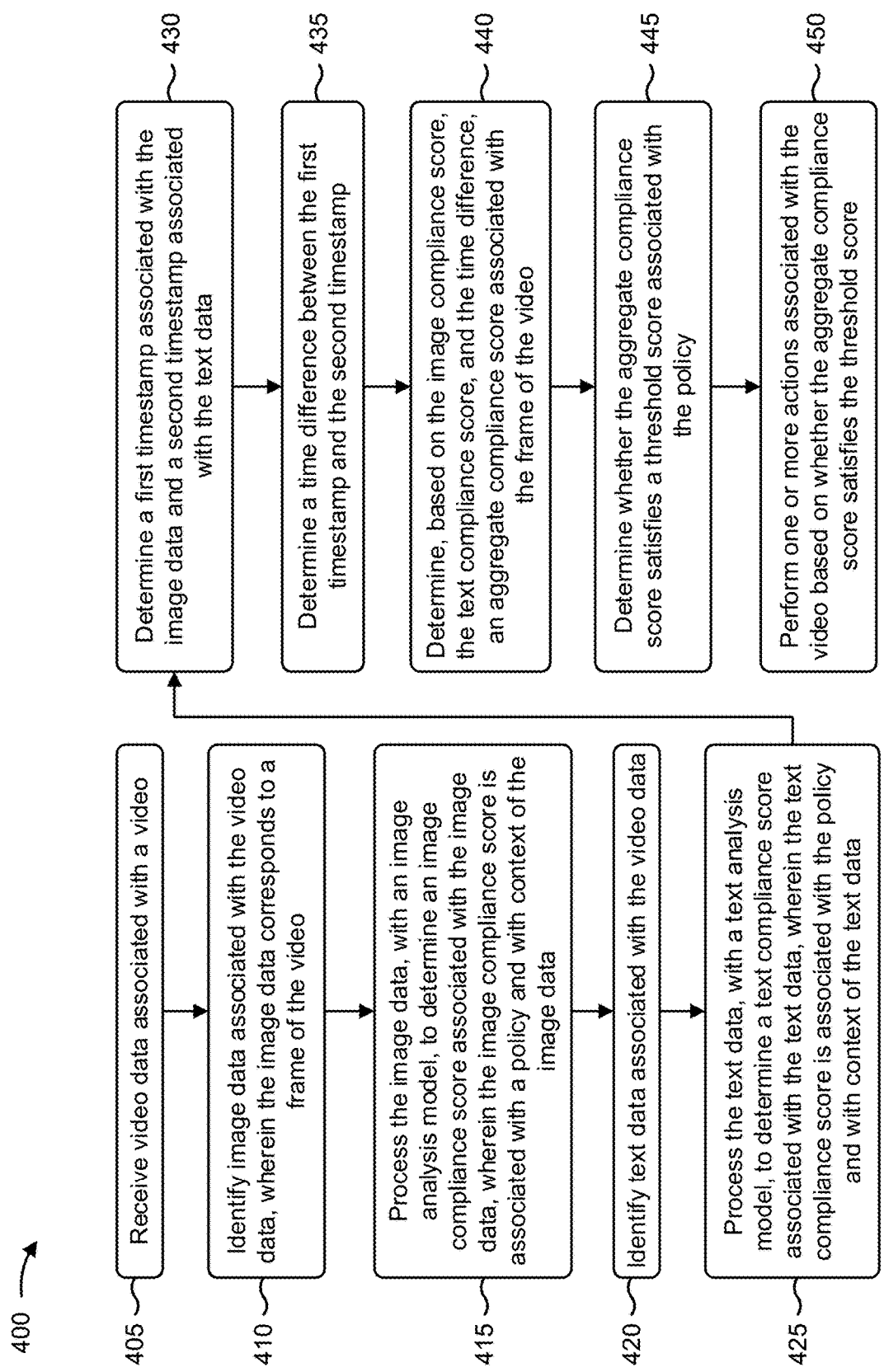
FIGS. 4-6 are flow charts of example processes for utilizing machine learning models to identify context of content for policy compliance determination.

FIG. 4 is a flow chart of an example process 400 for utilizing machine learning models to identify context of content for policy compliance determination. In some implementations, one or more process blocks of FIG. 4 may be performed by a device (e.g., contextual analysis platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving video data associated with a video (block 405). For example, the device (e.g., using computing resource 224, processor 320, communication interface 370, and/or the like) may receive video data associated with a video, as described above.

As further shown in FIG. 4, process 400 may include identifying image data associated with the video data, wherein the image data corresponds to a frame of the video (block 410). For example, the device (e.g., using computing resource 224, processor 320, memory 330, and/or the like) may identify image data associated with the video data, as described above. In some implementations, the image data may correspond to a frame of the video.

As further shown in FIG. 4, process 400 may include processing the image data, with an image analysis model, to determine an image compliance score associated with the image data, wherein the image compliance score is associated with a policy and with context of the image data (block 415). For example, the device (e.g., using computing resource 224, processor 320, storage component 340, and/or the like) may process the image data, with an image analysis model, to determine an image compliance score associated with the image data, as described above. In some implementations, the image compliance score may be associated with a policy and with context of the image data.

As further shown in FIG. 4, process 400 may include identifying text data associated with the video data (block 420). For example, the device (e.g., using computing resource 224, processor 320, memory 330, storage component 340, and/or the like) may identify text data associated with the video data, as described above.

As further shown in FIG. 4, process 400 may include processing the text data, with a text analysis model, to determine a text compliance score associated with the text data, wherein the text compliance score is associated with the policy and with context of the text data (block 425). For example, the device (e.g., using computing resource 224, processor 320, memory 330, and/or the like) may process the text data, with a text analysis model, to determine a text compliance score associated with the text data, as described above. In some implementations, the text compliance score may be associated with the policy and with context of the text data.

As further shown in FIG. 4, process 400 may include determining a first timestamp associated with the image data and a second timestamp associated with the text data (block 430). For example, the device (e.g., using computing resource 224, processor 320, storage component 340, and/or the like) may determine a first timestamp associated with the image data and a second timestamp associated with the text data, as described above.

As further shown in FIG. 4, process 400 may include determining a time difference between the first timestamp and the second timestamp (block 435). For example, the device (e.g., using computing resource 224, processor 320, memory 330, storage component 340, and/or the like) may determine a time difference between the first timestamp and the second timestamp, as described above.

As further shown in FIG. 4, process 400 may include determining, based on the image compliance score, the text compliance score, and the time difference, an aggregate compliance score associated with the frame of the video (block 440). For example, the device (e.g., using computing resource 224, processor 320, memory 330, and/or the like) may determine, based on the image compliance score, the text compliance score, and the time difference, an aggregate compliance score associated with the frame of the video, as described above.

As further shown in FIG. 4, process 400 may include determining whether the aggregate compliance score satisfies a threshold score associated with the policy (block 445). For example, the device (e.g., using computing resource 224, processor 320, storage component 340, and/or the like) may determine whether the aggregate compliance score satisfies a threshold score associated with the policy, as described above.

As further shown in FIG. 4, process 400 may include performing one or more actions associated with the video based on whether the aggregate compliance score satisfies the threshold score (block 450). For example, the device (e.g., using computing resource 224, processor 320, memory 330, storage component 340, communication interface 370, and/or the like) may perform one or more actions associated with the video based on whether the aggregate compliance score satisfies the threshold score, as described above.

Process 400 may include additional implementations, such as any single implementation or any combination of implementations described below and/or in connection with one or more other processes described elsewhere herein.

In a first implementation, process 400 may include receiving historical image data that includes images; identifying a plurality of objects included in the images of the historical image data; applying a respective tag to each of the plurality of objects to generate a plurality of tags; processing the plurality of tags applied to the plurality of objects, with a machine learning model, to determine associations between the plurality of tags; and training the image analysis model based on the associations between the plurality of tags, wherein the image analysis model may be trained to classify the associations between the plurality of tags as being non-compliant or compliant and to determine image compliance scores based on classifying the associations.

In a second implementation, alone or in combination with the first implementation, process 400 may include receiving historical text data that includes text; identifying a plurality of words included in the text of the historical text data; processing the plurality of words, with a machine learning model, to determine associations between the plurality of words; and training the text analysis model based on the associations between the plurality of words, wherein the text analysis model may be trained to classify the associations between the plurality of words as being non-compliant or compliant and to determine text compliance scores based on classifying the associations.

In a third implementation, alone or in combination with one or more of the first and second implementations, the one or more techniques may include one or more of a technique to convert the text to lowercase, a technique to remove punctuation from the text, a lemmatization technique, a stemming technique, or a stop words removal technique.

In a fourth implementation, alone or in combination with one or more of the first through third implementations, a timestamp of the image data may be within a threshold time period from a timestamp of the text data, and determining the aggregate compliance score may include determining the aggregate compliance score based on the timestamp of the image data being within the threshold time period from the timestamp of the text data.

In a fifth implementation, alone or in combination with one or more of the first through fourth implementations, processing the text data, with the text analysis model, to determine the text compliance score associated with the text data may include identifying a set of sentences in the text data; determining an intent score for each of the set of sentences, and processing the set of intent scores, with the text analysis model, to determine the text compliance score.

In a sixth implementation, alone or in combination with one or more of the first through fifth implementations, processing the image data, with the image analysis model, to determine the image compliance score associated with the image data may include identifying a set of objects in the image data; applying a respective tag to each of the set of objects to generate a set of tags; determining a vector for the image data based on the set of tags, and processing the vector, with the image analysis model, to determine the image compliance score.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
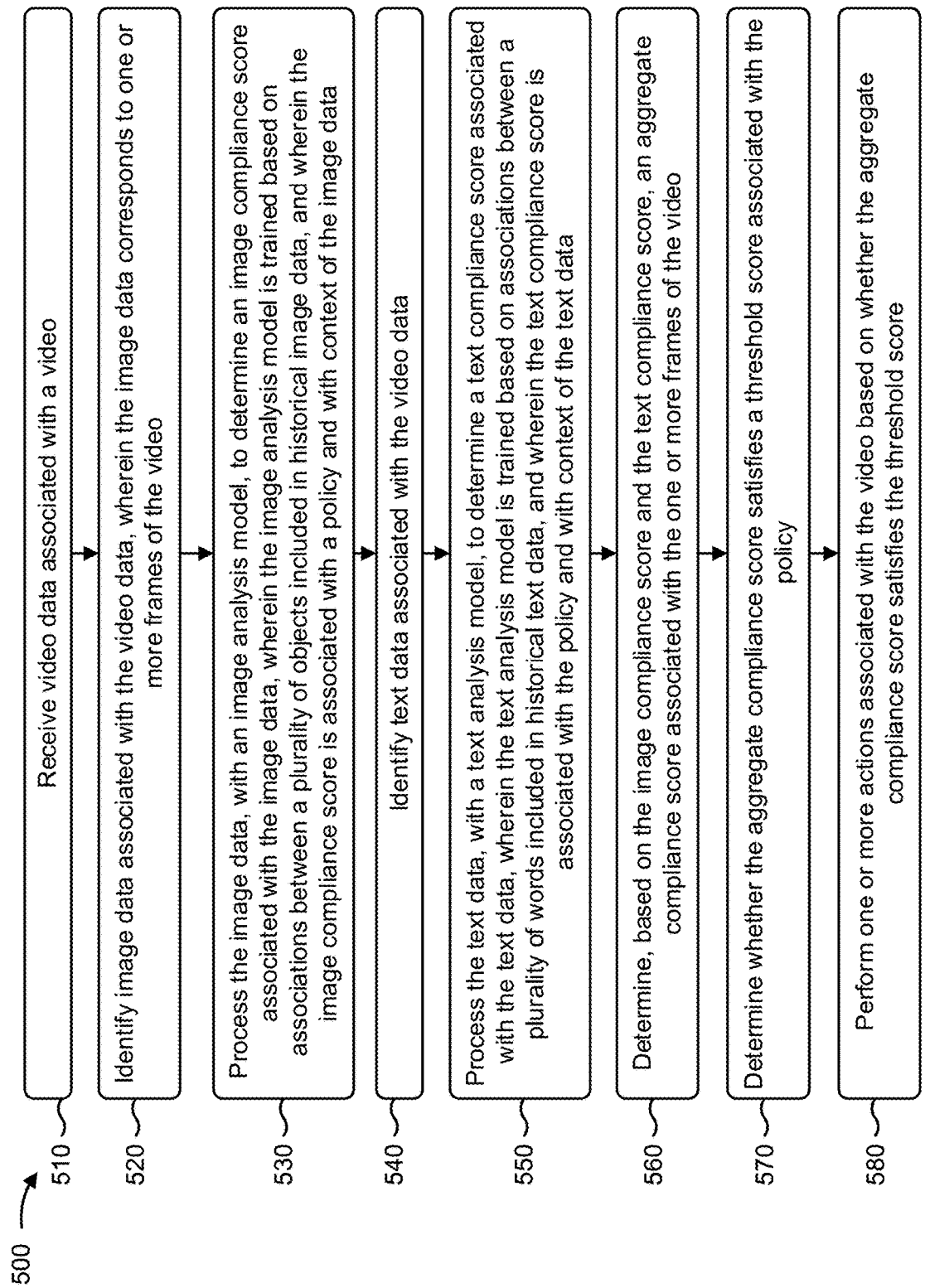

FIG. 5 is a flow chart of an example process 500 for utilizing machine learning models to identify context of content for policy compliance determination. In some implementations, one or more process blocks of FIG. 5 may be performed by a device (e.g., contextual analysis platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving video data associated with a video (block 510). For example, the device (e.g., using computing resource 224, processor 320, communication interface 370, and/or the like) may receive video data associated with a video, as described above.

As further shown in FIG. 5, process 500 may include identifying image data associated with the video data, wherein the image data corresponds to one or more frames of the video (block 520). For example, the device (e.g., using computing resource 224, processor 320, memory 330, and/or the like) may identify image data associated with the video data, as described above. In some implementations, the image data may correspond to one or more frames of the video.

As further shown in FIG. 5, process 500 may include processing the image data, with an image analysis model, to determine an image compliance score associated with the image data, wherein the image analysis model is trained based on associations between a plurality of objects included in historical image data, and wherein the image compliance score is associated with a policy and with context of the image data (block 530). For example, the device (e.g., using computing resource 224, processor 320, storage component 340, and/or the like) may process the image data, with an image analysis model, to determine an image compliance score associated with the image data, as described above. In some implementations, the image analysis model may be trained based on associations between a plurality of objects included in historical image data, and the image compliance score may be associated with a policy and with context of the image data.

As further shown in FIG. 5, process 500 may include identifying text data associated with the video data (block 540). For example, the device (e.g., using computing resource 224, processor 320, memory 330, storage component 340, and/or the like) may identify text data associated with the video data, as described above.

As further shown in FIG. 5, process 500 may include processing the text data, with a text analysis model, to determine a text compliance score associated with the text data, wherein the text analysis model is trained based on associations between a plurality of words included in historical text data, and wherein the text compliance score is associated with the policy and with context of the text data (block 550). For example, the device (e.g., using computing resource 224, processor 320, memory 330, and/or the like) may process the text data, with a text analysis model, to determine a text compliance score associated with the text data, as described above. In some implementations, the text analysis model may be trained based on associations between a plurality of words included in historical text data, and the text compliance score may be associated with the policy and with context of the text data.

As further shown in FIG. 5, process 500 may include determining, based on the image compliance score and the text compliance score, an aggregate compliance score associated with the one or more frames of the video (block 560). For example, the device (e.g., using computing resource 224, processor 320, storage component 340, and/or the like) may determine, based on the image compliance score and the text compliance score, an aggregate compliance score associated with the one or more frames of the video, as described above.

As further shown in FIG. 5, process 500 may include determining whether the aggregate compliance score satisfies a threshold score associated with the policy (block 570). For example, the device (e.g., using computing resource 224, processor 320, memory 330, and/or the like) may determine whether the aggregate compliance score satisfies a threshold score associated with the policy, as described above.

As further shown in FIG. 5, process 500 may include performing one or more actions associated with the video based on whether the aggregate compliance score satisfies the threshold score (block 580). For example, the device (e.g., using computing resource 224, processor 320, memory 330, storage component 340, communication interface 370, and/or the like) may perform one or more actions associated with the video based on whether the aggregate compliance score satisfies the threshold score, as described above.

Process 500 may include additional implementations, such as any single implementation or any combination of implementations described below and/or in connection with one or more other processes described elsewhere herein.

In a first implementation, process 500 may include identifying a set of words in the text data, determining a vector for the text data based on the set of the words, and processing the vector, with the text analysis model, to determine the text compliance score.

In a second implementation, alone or in combination with the first implementation, the video may be hosted by a content platform and the one or more actions may be performed within a threshold time period of the video being uploaded to the content platform.

In a third implementation, alone or in combination with one or more of the first and second implementations, performing the one or more actions associated with the video may include approving the one or more frames of the video when the aggregate compliance score satisfies the threshold score; analyzing remaining frames of the video when the aggregate compliance score satisfies the threshold score; or rejecting the video when the aggregate compliance score fails to satisfy the threshold score.

In a fourth implementation, alone or in combination with one or more of the first through third implementations, performing the one or more actions associated with the video may include providing, to a client device that provided the video, information indicating whether the video is approved or rejected based on whether the aggregate compliance score satisfies the threshold score; providing, to a content platform requested to host the video, information indicating whether the video is approved or rejected based on whether the aggregate compliance score satisfies the threshold score; causing a law enforcement agency to be notified when the aggregate compliance score fails to satisfy the threshold score; or updating the image analysis model or the text analysis model based on whether the aggregate compliance score satisfies the threshold score.

In a fifth implementation, alone or in combination with one or more of the first through fourth implementations, each of the image analysis model and the text analysis model may include one or more of a logistic regression model, a gradient boost model, a random forest model, a multinomial naïve Bayesian model, or a neural network model.

In a sixth implementation, alone or in combination with one or more of the first through fifth implementations, process 500 may include determining that the video is compliant with the policy when the aggregate compliance score satisfies the threshold score; or determining that the video is non-compliant with the policy when the aggregate compliance score fails to satisfy the threshold score.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
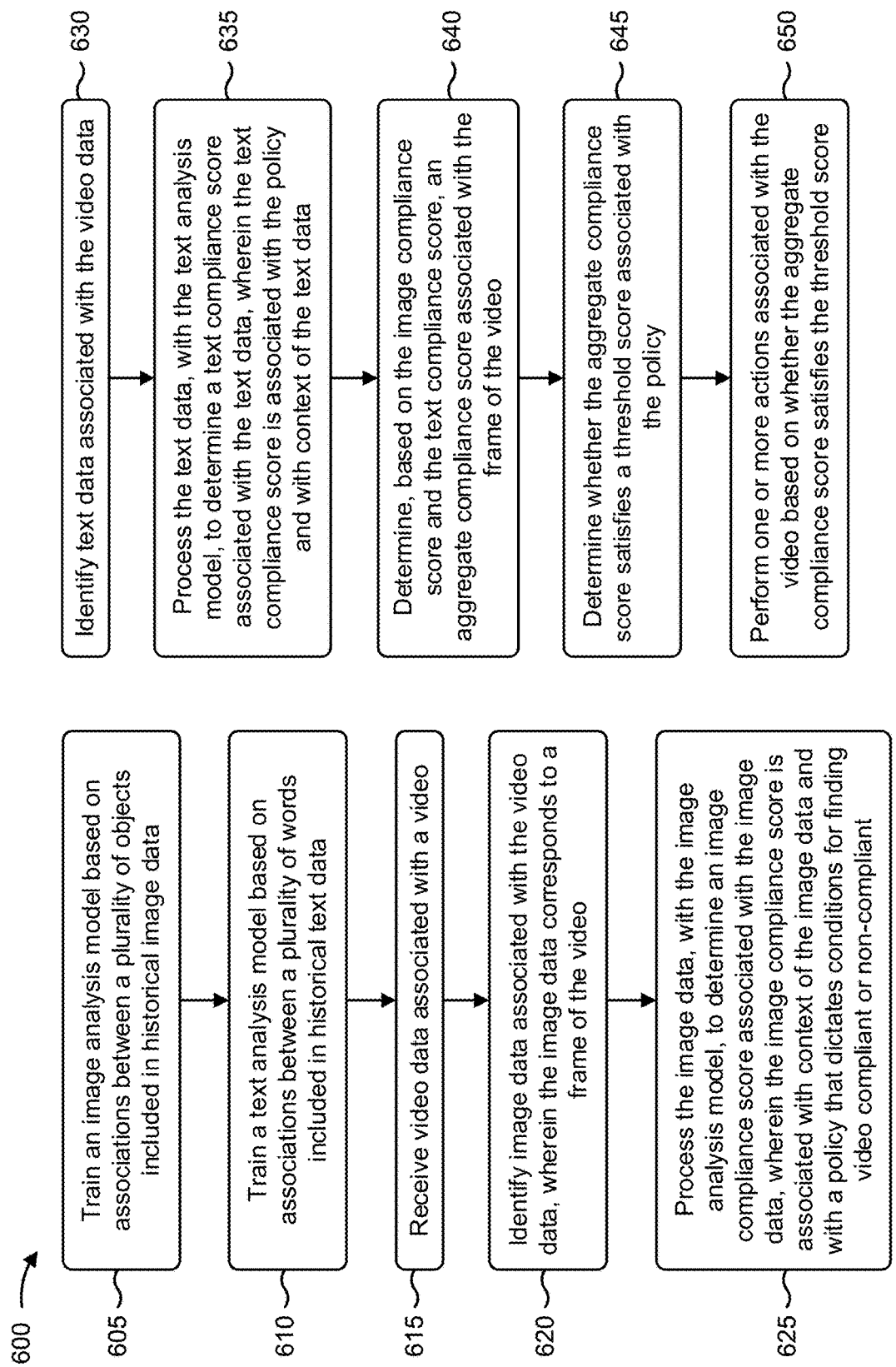

FIG. 6 is a flow chart of an example process 600 for utilizing machine learning models to identify context of content for policy compliance determination. In some implementations, one or more process blocks of FIG. 6 may be performed by a device (e.g., contextual analysis platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include training an image analysis model based on associations between a plurality of objects included in historical image data (block 605). For example, the device (e.g., using computing resource 224, processor 320, memory 330, and/or the like) may train an image analysis model based on associations between a plurality of objects included in historical image data, as described above.

As further shown in FIG. 6, process 600 may include training a text analysis model based on associations between a plurality of words included in historical text data (block 610). For example, the device (e.g., using computing resource 224, processor 320, storage component 340, and/or the like) may train a text analysis model based on associations between a plurality of words included in historical text data, as described above.

As further shown in FIG. 6, process 600 may include receiving video data associated with a video (block 615). For example, the device (e.g., using computing resource 224, processor 320, communication interface 370, and/or the like) may receive video data associated with a video, as described above.

As further shown in FIG. 6, process 600 may include identifying image data associated with the video data, wherein the image data corresponds to a frame of the video (block 620). For example, the device (e.g., using computing resource 224, processor 320, memory 330, and/or the like) may identify image data associated with the video data, as described above. In some implementations, the image data may correspond to a frame of the video.

As further shown in FIG. 6, process 600 may include processing the image data, with the image analysis model, to determine an image compliance score associated with the image data, wherein the image compliance score is associated with context of the image data and with a policy that dictates conditions for finding video compliant or non-compliant (block 625). For example, the device (e.g., using computing resource 224, processor 320, storage component 340, and/or the like) may process the image data, with the image analysis model, to determine an image compliance score associated with the image data, as described above. In some implementations, the image compliance score may be associated with context of the image data and with a policy that dictates conditions for finding video compliant or non-compliant.

As further shown in FIG. 6, process 600 may include identifying text data associated with the video data (block 630). For example, the device (e.g., using computing resource 224, processor 320, memory 330, and/or the like) may identify text data associated with the video data, as described above.

As further shown in FIG. 6, process 600 may include processing the text data, with the text analysis model, to determine a text compliance score associated with the text data, wherein the text compliance score is associated with the policy and with context of the text data (block 635). For example, the device (e.g., using computing resource 224, processor 320, storage component 340, and/or the like) may process the text data, with the text analysis model, to determine a text compliance score associated with the text data, as described above. In some implementations, the text compliance score may be associated with the policy and with context of the text data.

As further shown in FIG. 6, process 600 may include determining, based on the image compliance score and the text compliance score, an aggregate compliance score associated with the frame of the video (block 640). For example, the device (e.g., using computing resource 224, processor 320, memory 330, and/or the like) may determine, based on the image compliance score and the text compliance score, an aggregate compliance score associated with the frame of the video, as described above.

As further shown in FIG. 6, process 600 may include determining whether the aggregate compliance score satisfies a threshold score associated with the policy (block 645). For example, the device (e.g., using computing resource 224, processor 320, storage component 340, and/or the like) may determine whether the aggregate compliance score satisfies a threshold score associated with the policy, as described above.

As further shown in FIG. 6, process 600 may include performing one or more actions associated with the video based on whether the aggregate compliance score satisfies the threshold score (block 650). For example, the device (e.g., using computing resource 224, processor 320, memory 330, storage component 340, communication interface 370, and/or the like) may perform one or more actions associated with the video based on whether the aggregate compliance score satisfies the threshold score, as described above.

Process 600 may include additional implementations, such as any single implementation or any combination of implementations described below and/or in connection with one or more other processes described elsewhere herein.

In a first implementation, a timestamp of the image data may be within a threshold time period from a timestamp of the text data, and determining the aggregate compliance score may include determining the aggregate compliance score based on the timestamp of the image data being within the threshold time period from the timestamp of the text data.

In a second implementation, alone or in combination with the first implementation, process 600 may include determining a first timestamp associated with the image data; determining a second timestamp associated with the text data; determining a time difference between the first timestamp and the second timestamp; and determining the aggregate compliance score based on the time difference.

In a third implementation, alone or in combination with one or more of the first and second implementations, process 600 may include identifying a set of objects in the image data; determining a vector for the image data based on the set of the objects; and processing the vector, with the image analysis model, to determine the image compliance score.

In a fourth implementation, alone or in combination with one or more of the first through third implementations, process 600 may include identifying a set of words in the text data; determining a vector for the text data based on the set of the words; and processing the vector, with the text analysis model, to determine the text compliance score.

In a fifth implementation, alone or in combination with one or more of the first through fourth implementations, performing the one or more actions associated with the video may include approving the frame of the video when the aggregate compliance score satisfies the threshold score; analyzing remaining frames of the video when the aggregate compliance score satisfies the threshold score; rejecting the video when the aggregate compliance score fails to satisfy the threshold score; providing, to a client device that provided the video, information indicating whether the video is approved or rejected based on whether the aggregate compliance score satisfies the threshold score; providing, to a content platform requested to host the video, information indicating whether the video is approved or rejected based on whether the aggregate compliance score satisfies the threshold score; causing a law enforcement agency to be notified when the aggregate compliance score fails to satisfy the threshold score; or updating the image analysis model or the text analysis model based on whether the aggregate compliance score satisfies the threshold score.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A method, comprising:
receiving, by a device, video data associated with a video;
identifying, by the device, image data associated with the video data,
wherein the image data corresponds to a frame of the video;
processing, by the device, the image data, with an image analysis model, to determine an image compliance score associated with the image data,
wherein the image compliance score is associated with a policy and with context of the image data;
identifying, by the device, text data associated with the video data;
processing, by the device, the text data, with a text analysis model, to determine a text compliance score associated with the text data,
wherein the text compliance score is associated with the policy and with context of the text data;
determining, by the device, a first timestamp associated with the image data and a second timestamp associated with the text data;
determining, by the device, a time difference between the first timestamp and the second timestamp;
determining, by the device and based on the image compliance score, the text compliance score, and the time difference, an aggregate compliance score associated with the frame of the video;
determining, by the device, whether the aggregate compliance score satisfies a threshold score associated with the policy; and
performing, by the device, one or more actions associated with the video based on whether the aggregate compliance score satisfies the threshold score.
2. The method of claim 1, further comprising:
receiving historical image data that includes images;
identifying a plurality of objects included in the images of the historical image data;
applying a respective tag to each of the plurality of objects to generate a plurality of tags;
processing the plurality of tags applied to the plurality of objects, with a machine learning model, to determine associations between the plurality of tags; and
training the image analysis model based on the associations between the plurality of tags,
wherein the image analysis model is trained to classify the associations between the plurality of tags as being non-compliant or compliant and to determine image compliance scores based on classifying the associations.

3. The method of claim 1, further comprising:
receiving historical text data that includes text;
identifying a plurality of words included in the text of the historical text data;
processing the plurality of words, with a machine learning model, to determine associations between the plurality of words; and
training the text analysis model based on the associations between the plurality of words,
wherein the text analysis model is trained to classify the associations between the plurality of words as being non-compliant or compliant and to determine text compliance scores based on classifying the associations.

4. The method of claim 3, further comprising:
preprocessing the historical text data with one or more techniques prior to identifying the plurality of words included in the text,
wherein the one or more techniques include one or more of:
a technique to convert the text to lowercase,
a technique to remove punctuation from the text,
a lemmatization technique,
a stemming technique, or
a stop words removal technique.

5. The method of claim 1, wherein a timestamp of the image data is within a threshold time period from a timestamp of the text data, and
wherein determining the aggregate compliance score comprises:
determining the aggregate compliance score based on the timestamp of the image data being within the threshold time period from the timestamp of the text data.

6. The method of claim 1, wherein processing the text data, with the text analysis model, to determine the text compliance score associated with the text data comprises:
identifying a set of sentences in the text data;
determining an intent score for each of the set of sentences; and
processing the set of intent scores, with the text analysis model, to determine the text compliance score.

7. The method of claim 1, wherein processing the image data, with the image analysis model, to determine the image compliance score associated with the image data comprises:
identifying a set of objects in the image data;
applying a respective tag to each of the set of objects to generate a set of tags;
determining a vector for the image data based on the set of tags; and
processing the vector, with the image analysis model, to determine the image compliance score.

8. A device, comprising:
one or more memories; and
one or more processors, communicatively coupled to the one or more memories, configured to:
receive video data associated with a video;
identify image data associated with the video data,
wherein the image data corresponds to one or more frames of the video;
process the image data, with an image analysis model, to determine an image compliance score associated with the image data,
wherein the image analysis model is trained based on associations between a plurality of objects included in historical image data, and
wherein the image compliance score is associated with a policy and with context of the image data;
identify text data associated with the video data;
process the text data, with a text analysis model, to determine a text compliance score associated with the text data,
wherein the text analysis model is trained based on associations between a plurality of words included in historical text data, and
wherein the text compliance score is associated with the policy and with context of the text data;
determine, based on the image compliance score and the text compliance score, an aggregate compliance score associated with the one or more frames of the video;
determine whether the aggregate compliance score satisfies a threshold score associated with the policy; and
perform one or more actions associated with the video based on whether the aggregate compliance score satisfies the threshold score.

9. The device of claim 8, wherein the one or more processors, when processing the text data, with the text analysis model, to determine the text compliance score associated with the text data, are configured to:
identify a set of words in the text data;
determine a vector for the text data based on the set of the words; and
process the vector, with the text analysis model, to determine the text compliance score.

10. The device of claim 8, wherein the video is hosted by a content platform and the one or more actions are performed within a threshold time period of the video being uploaded to the content platform.

11. The device of claim 8, wherein the one or more processors, when performing the one or more actions associated with the video, are configured to one or more of:
approve the one or more frames of the video when the aggregate compliance score satisfies the threshold score;
analyze remaining frames of the video when the aggregate compliance score satisfies the threshold score; or
reject the video when the aggregate compliance score fails to satisfy the threshold score.

12. The device of claim 8, wherein the one or more processors, when performing the one or more actions associated with the video, are configured to one or more of:
provide, to a client device that provided the video, information indicating whether the video is approved or rejected based on whether the aggregate compliance score satisfies the threshold score;
provide, to a content platform requested to host the video, information indicating whether the video is approved or rejected based on whether the aggregate compliance score satisfies the threshold score;
cause a law enforcement agency to be notified when the aggregate compliance score fails to satisfy the threshold score; or
update the image analysis model or the text analysis model based on whether the aggregate compliance score satisfies the threshold score.

13. The device of claim 8, wherein each of the image analysis model and the text analysis model includes one or more of:
- a logistic regression model,
- a gradient boost model
- a random forest model,
- a multinomial naïve Bayesian model, or
- a neural network model.

14. The device of claim 8, wherein the one or more processors, when performing the one or more actions associated with the video, are configured to:
- determine that the video is compliant with the policy when the aggregate compliance score satisfies the threshold score; or
- determine that the video is non-compliant with the policy when the aggregate compliance score fails to satisfy the threshold score.

15. A non-transitory computer-readable medium storing instructions, the instructions comprising:
- one or more instructions that, when executed by one or more processors, cause the one or more processors to:
  - train an image analysis model based on associations between a plurality of objects included in historical image data;
  - train a text analysis model based on associations between a plurality of words included in historical text data;
  - receive video data associated with a video;
  - identify image data associated with the video data,
    - wherein the image data corresponds to a frame of the video;
  - process the image data, with the image analysis model, to determine an image compliance score associated with the image data,
    - wherein the image compliance score is associated with context of the image data and with a policy that dictates conditions for finding video compliant or non-compliant;
  - identify text data associated with the video data;
  - process the text data, with the text analysis model, to determine a text compliance score associated with the text data,
    - wherein the text compliance score is associated with the policy and with context of the text data;
  - determine, based on the image compliance score and the text compliance score, an aggregate compliance score associated with the frame of the video;
  - determine whether the aggregate compliance score satisfies a threshold score associated with the policy; and
  - perform one or more actions associated with the video based on whether the aggregate compliance score satisfies the threshold score.

16. The non-transitory computer-readable medium of claim 15, wherein a timestamp of the image data is within a threshold time period from a timestamp of the text data, and
wherein the one or more instructions, that cause the one or more processors to determine the aggregate compliance score, cause the one or more processors to:
- determine the aggregate compliance score based on the timestamp of the image data being within the threshold time period from the timestamp of the text data.

17. The non-transitory computer-readable medium of claim 15, wherein the one or more instructions, when executed by the one or more processors, further cause the one or more processors to:
- determine a first timestamp associated with the image data;
- determine a second timestamp associated with the text data; and
- determine a time difference between the first timestamp and the second timestamp,
  - wherein the one or more instructions, that cause the one or more processors to determine the aggregate compliance score, cause the one or more processors to:
    - determine the aggregate compliance score based on the time difference.

18. The non-transitory computer-readable medium of claim 15, wherein the one or more instructions, that cause the one or more processors to process the image data, with the image analysis model, to determine the image compliance score associated with the image data, cause the one or more processors to:
- identify a set of objects in the image data;
- determine a vector for the image data based on the set of the objects; and
- process the vector, with the image analysis model, to determine the image compliance score.

19. The non-transitory computer-readable medium of claim 15, wherein the one or more instructions, that cause the one or more processors to process the text data, with the text analysis model, to determine the text compliance score associated with the text data, cause the one or more processors to:
- identify a set of words in the text data;
- determine a vector for the text data based on the set of the words; and
- process the vector, with the text analysis model, to determine the text compliance score.

20. The non-transitory computer-readable medium of claim 15, wherein the one or more instructions, that cause the one or more processors to perform the one or more actions associated with the video, cause the one or more processors to one or more of:
- approve the frame of the video when the aggregate compliance score satisfies the threshold score;
- analyze remaining frames of the video when the aggregate compliance score satisfies the threshold score;
- reject the video when the aggregate compliance score fails to satisfy the threshold score;
- provide, to a client device that provided the video, information indicating whether the video is approved or rejected based on whether the aggregate compliance score satisfies the threshold score;
- provide, to a content platform requested to host the video, information indicating whether the video is approved or rejected based on whether the aggregate compliance score satisfies the threshold score;
- cause a law enforcement agency to be notified when the aggregate compliance score fails to satisfy the threshold score; or
- update the image analysis model or the text analysis model based on whether the aggregate compliance score satisfies the threshold score.

\* \* \* \* \*